(12) United States Patent
Rich et al.

(10) Patent No.: US 11,068,244 B2
(45) Date of Patent: Jul. 20, 2021

(54) OPTIMIZED TRANSPILATION

(71) Applicant: salesforce.com, inc., San Francisco, CA (US)

(72) Inventors: Alexander Rich, Fremont, CA (US); Jinai Kathiara, Walnut Creek, CA (US)

(73) Assignee: salesforce.com, inc., San Francisco, CA (US)

(*) Notice: Subject to any disclaimer, the term of this patent is extended or adjusted under 35 U.S.C. 154(b) by 39 days.

(21) Appl. No.: 16/589,998

(22) Filed: Oct. 1, 2019

(65) Prior Publication Data

US 2021/0096832 A1   Apr. 1, 2021

(51) Int. Cl.
  *G06F 8/41*    (2018.01)
  *G06F 7/24*    (2006.01)
  *G06F 40/154*  (2020.01)
  *G06F 40/211*  (2020.01)

(52) U.S. Cl.
  CPC ........... *G06F 8/427* (2013.01); *G06F 7/24* (2013.01); *G06F 8/443* (2013.01); *G06F 40/154* (2020.01); *G06F 40/211* (2020.01)

(58) Field of Classification Search
  CPC ...... G06F 8/427; G06F 40/154; G06F 40/211; G06F 8/443; G06F 7/24
  See application file for complete search history.

(56) References Cited

U.S. PATENT DOCUMENTS

| 5,577,188 | A  | 11/1996 | Zhu |
| 5,608,872 | A  | 3/1997  | Schwartz et al. |
| 5,649,104 | A  | 7/1997  | Carleton et al. |
| 5,715,450 | A  | 2/1998  | Ambrose et al. |
| 5,761,419 | A  | 6/1998  | Schwartz et al. |
| 5,819,038 | A  | 10/1998 | Carleton et al. |
| 5,821,937 | A  | 10/1998 | Tonelli et al. |
| 5,831,610 | A  | 11/1998 | Tonelli et al. |
| 5,873,096 | A  | 2/1999  | Lim et al. |
| 5,918,159 | A  | 6/1999  | Fomukong et al. |
| 5,963,953 | A  | 10/1999 | Cram et al. |
| 6,092,083 | A  | 7/2000  | Brodersen et al. |
| 6,169,534 | B1 | 1/2001  | Raffel et al. |
| 6,178,425 | B1 | 1/2001  | Brodersen et al. |
| 6,189,011 | B1 | 2/2001  | Lim et al. |
| 6,216,135 | B1 | 4/2001  | Brodersen et al. |
| 6,233,617 | B1 | 5/2001  | Rothwein et al. |
| 6,266,669 | B1 | 7/2001  | Brodersen et al. |
| 6,295,530 | B1 | 9/2001  | Ritchie et al. |
| 6,324,568 | B1 | 11/2001 | Diec |

(Continued)

OTHER PUBLICATIONS

Lee, Hyo-Sub, and Kyung-Goo Doh. "Tree-pattern-based duplicate code detection." Proceedings of the ACM first international workshop on Data-intensive software management and mining. 2009. (Year: 2009).*

(Continued)

*Primary Examiner* — Matthew J Brophy
(74) *Attorney, Agent, or Firm* — Jaffery Watson Mendonsa & Hamilton LLP

(57) ABSTRACT

System and methods are described to parse input source code and generate a tree representing the input source code, optimize the tree by determining reusable sub-trees of the tree and replacing the reusable sub-trees with variables, and transpile the optimized tree to generate output source code.

21 Claims, 21 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 8,607,206 B2* | 12/2013 | Freeman .................. G06F 8/70 717/137 |
| 9,111,071 B2* | 8/2015 | Kerschbaum ........... G06F 21/10 |
| 9,430,200 B1* | 8/2016 | Trofin .................. G06F 8/4435 |
| 9,710,243 B2* | 7/2017 | O'Hara .................. G06F 8/71 |
| 9,740,463 B2* | 8/2017 | Grimmer ................. G06F 8/41 |
| 10,152,309 B2* | 12/2018 | Trofin ..................... G06F 8/72 |
| 10,552,128 B1* | 2/2020 | Bailey ..................... G06F 8/43 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0242145 A1* | 10/2006 | Krishnamurthy ....... G06F 16/38 |
| 2007/0011669 A1* | 1/2007 | Varma ..................... G06F 8/51 717/168 |
| 2009/0177744 A1 | 7/2009 | Marlow et al. |
| 2012/0079463 A1* | 3/2012 | Freeman .................. G06F 8/70 717/137 |
| 2014/0282373 A1* | 9/2014 | Garza ..................... G06F 8/51 717/106 |
| 2015/0128114 A1* | 5/2015 | O'Hara .................. G06F 8/71 717/143 |
| 2015/0160934 A1* | 6/2015 | Beit-Aharon ............ G06F 8/51 717/137 |
| 2017/0046137 A1* | 2/2017 | Grimmer ................. G06F 8/51 |
| 2018/0165077 A1* | 6/2018 | Beit-Aharon ............ G06F 8/76 |
| 2018/0165078 A1* | 6/2018 | Beit-Aharon ............ G06F 8/51 |
| 2018/0196651 A1* | 7/2018 | Dettinger ................. G06F 8/51 |
| 2018/0276417 A1* | 9/2018 | Cerezo Sanchez ..... G06F 21/74 |
| 2020/0201860 A1* | 6/2020 | Vogelsgesang ... G06F 16/24537 |
| 2020/0257613 A1* | 8/2020 | Yoshida .................. G06F 8/427 |

OTHER PUBLICATIONS

Baxter, Ira D., et al. "Clone detection using abstract syntax trees." Proceedings. International Conference on Software Maintenance (Cat. No. 98CB36272). IEEE, 1998. (Year: 1998).*

Tairas, Robert, and Jeff Gray. "Phoenix-based clone detection using suffix trees." Proceedings of the 44th annual Southeast regional conference. 2006. (Year: 2006).*

Jiang, Lingxiao, et al. "Deckard: Scalable and accurate tree-based detection of code clones." 29th International Conference on Software Engineering (ICSE'07). IEEE, 2007. (Year: 2007).*

Lazar, Flavius-Mihai, and Ovidiu Banias. "Clone detection algorithm based on the abstract syntax tree approach." 2014 IEEE 9th IEEE International Symposium on Applied Computational Intelligence and Informatics (SACI). IEEE, 2014. (Year: 2014).*

Cantiello, Pasquale, and Beniamino Di Martino. "Automatic source code transformation for GPUs based on program comprehension." European Conference on Parallel Processing. Springer, Berlin, Heidelberg, 2011. (Year: 2011).*

* cited by examiner

ORIGINAL FORMULA

ORIGINAL FORMULA

| IF (A = 0, 1, CEILING ((B / A) + FLOOR (B / A))) | 1200

FIG. 12

DEFINE X

DEFINE Y

DEFINE Z

1400

US 11,068,244 B2

OPTIMIZED TRANSPILATION

TECHNICAL FIELD

One or more implementations relate to transpiling, and more specifically to optimizing the transpilation of a source input code into a source output code in a distributed system of a cloud computing environment.

BACKGROUND

"Cloud computing" services provide shared resources, software, and information to computers and other devices upon request or on demand. Cloud computing typically involves the over-the-Internet provision of dynamically scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

Computer programs (also called application programs or simply applications) may be written to process data and/or control data processing operations in a cloud computing environment. A computer program may be compiled or transpiled. Compiling is a general term for taking source code written in one language and transforming it into another language. Transpiling is a specific term for taking input source code written in one language and transforming it into another language at a similar level of abstraction. The output source code is often understandable by a human but may need to be evaluated and/or interpreted on a computing system to perform the encoded actions. In some situations, the output source code generated by a transpiler is excessively long and complex, taking up too much processing time to generate, large data transfers to send to another computing system, and large computational loads to evaluate and/or interpret. Thus, better techniques of transpilation are desirable.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

FIG. 6 illustrates an example of a first formula as source input code.

FIG. 12 illustrates an example of a second formula as source input code.

DETAILED DESCRIPTION

Embodiments of the present invention comprise an optimizing transpiler system to generate, from an input source code written in a first language, an output source code written in a second language that may be evaluated to perform desired functions or actions in a distributed computing system. In an embodiment, the input source code conforms to a syntax for a formula language commercially used by and available from Salesforce, Inc. In an embodiment, the output source code conforms to JavaScript (JS), a high-level interpreted scripting language defined by the ECMAScript language specification, $10^{th}$ edition, June 2019, or earlier editions, published by the European Computer Manufacturers Association (ECMA). In other embodiments, other languages for the input source code and the output source code may be used. By using the formula language, system administrators and/or users can define formulas declaratively, have the formula saved in a database, and then evaluate the formula at run-time on a client system in the format of the output source code (such as JS).

One drawback of some transpiler implementations is that e generated output source code can be excessively long. Long output source code requires more memory and time to generate, takes longer to transfer to client systems, and results in long interpretation times on the client systems.

Embodiments of the present invention generate simpler and more concise output source code, resulting in efficiency improvements throughout the distributed computing system. In an embodiment, a node-to-node traversal of a data structure called an abstract syntax tree (AST) used to store the formula is performed where each node of the AST is parsed from the formula (e.g., input source code) to determine if the node's contents can be represented as a stored variable. This can be complicated because not every part of the formula should be evaluated (to prevent against null pointers exceptions, for example). Thus, each variable should have a guard to tell whether or not the variable should be evaluated. In embodiments of the present invention, the optimizing transpiler is aware of the entire formula during formula processing, and thus can process the entire AST for that formula. This means the AST can be traversed recursively and the optimizing transpiler can handle a variety of different input formulas as the input source code. In embodiments, parts of the entire formula can be processed separately to determine optimal ways to combine and/or separate parts of the formula for better performance and data usage.

Figure 1A:
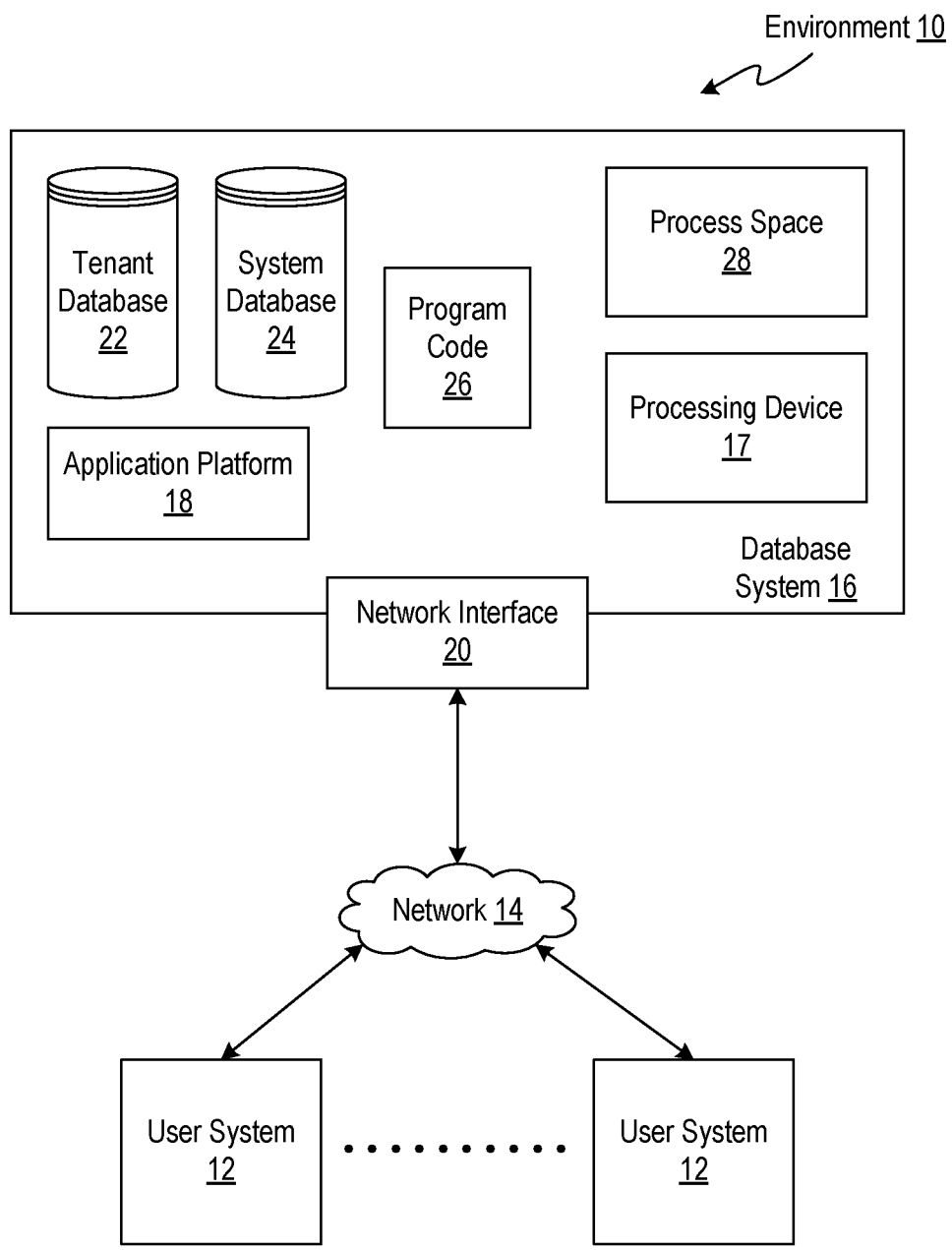
FIG. 1A illustrates an example computing environment of an on-demand database service according to some embodiments.

FIG. 1A illustrates a block diagram of an example of a cloud computing environment 10 in which an on-demand database service can be used in accordance with some implementations. Environment 10 includes user systems 12 (e.g., customer's computing systems), a network 14, a database system 16 (also referred to herein as a "cloud-based system" or a "cloud computing system"), a processing device 17, an application platform 18, a network interface 20, a tenant database 22 for storing tenant data (such as data sets), a system database 24 for storing system data, program code 26 for implementing various functions of the database system 16 (including a visual data cleaning application), and process space 28 for executing database system processes and tenant-specific processes, such as running applications for customers as part of an application hosting service. In some other implementations, environment 10 may not have all these components or systems, or may have other components or systems instead of, or in addition to, those listed above. In some embodiments, tenant database 22 is a shared storage.

In some implementations, environment 10 is a computing environment in which an on-demand database service (such as a distributed search application) exists. An on-demand database service, such as that which can be implemented using database system 16, is a service that is made available to users outside an enterprise (or enterprises) that owns, maintains, or provides access to database system 16. As described above, such users generally do not need to be concerned with building or maintaining database system 16. Instead, resources provided by database system 16 may be available for such users' use when the users need services provided by database system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a large number of customers, and a given database table may store rows of data for a potentially much larger number of customers. A database image can include one or more database objects. A relational database management system (RDBMS) or the equivalent can execute storage and retrieval of information against the database object(s).

Application platform 18 can be a framework that allows the applications of database system 16 to execute, such as the hardware or software infrastructure of database system 16. In some implementations, application platform 18 enables the creation, management and execution of one or more applications developed by the provider of the on-demand database service, users accessing the on-demand database service via user systems 12, or third-party application developers accessing the on-demand database service via user systems 12.

In some embodiments, application platform 18 includes a transpiler for generating output source code (such as JavaScript (JS)) from input source code (such as a formula language), the output source code to be evaluated by one or more user systems 12.

In some implementations, database system 16 implements a web-based customer relationship management (CRM) system. For example, in some such implementations, database system 16 includes application servers configured to implement and execute CRM software applications as well as provide related data, code, forms, renderable web pages, and documents and other information to and from user systems 12 and to store to, and retrieve from, a database system related data, objects, and World Wide Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. Database system 16 also implements applications other than, or in addition to, a CRM application. For example, database system 16 can provide tenant access to multiple hosted (standard and custom) applications, including a CRM application. User (or third-party developer) applications, which may or may not include CRM, may be supported by application platform 18. Application platform 18 manages the creation and storage of the applications into one or more database objects and the execution of the applications in one or more virtual machines in the process space of database system 16.

According to some implementations, each database system 16 is configured to provide web pages, forms, applications, data, and media content to user (client) systems 12 to support the access by user systems 12 as tenants of database system 16. As such, database system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application, such as an object-oriented database management system (OODBMS) or a relational database management system (RDBMS), as is well known in the art. It should also be understood that "server system", "server", "server node", and "node" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

Network 14 can be or include any network or combination of networks of systems or devices that communicate with one another. For example, network 14 can be or include any one or any combination of a local area network (LAN), wide area network (WAN), telephone network, wireless network, cellular network, point-to-point network, star network, token ring network, hub network, or other appropriate configuration. Network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

User systems 12 (e.g., operated by customers) can communicate with database system 16 using TCP/IP and, at a higher network level, other common Internet protocols to communicate, such as the Hyper Text Transfer Protocol (HTTP), Hyper Text Transfer Protocol Secure (HTTPS), File Transfer Protocol (FTP), Apple File Service (AFS), Wireless Application Protocol (WAP), etc. In an example where HTTP is used, each user system 12 can include an HTTP client commonly referred to as a "web browser" or simply a "browser" for sending and receiving HTTP signals to and from an HTTP server of the database system 16. Such an HTTP server can be implemented as the sole network interface 20 between database system 16 and network 14, but other techniques can be used in addition to or instead of these techniques. In some implementations, network interface 20 between database system 16 and network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

User systems 12 can be implemented as any computing device(s) or other data processing apparatus or systems usable by users to access database system 16. For example, any of user systems 12 can be a desktop computer, a work station, a laptop computer, a tablet computer, a handheld computing device, a mobile cellular phone (for example, a "smartphone"), or any other Wi-Fi-enabled device, WAP-enabled device, or other computing device capable of interfacing directly or indirectly to the Internet or other network. When discussed in the context of a user, the terms "user system," "user device," and "user computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, Google's Chrome browser, or a WAP-enabled browser in the case of a cellular phone, personal digital assistant (PDA), or other wireless device, allowing a user (for example, a subscriber of on-demand services provided by database system 16) of user system 12 to access, process, and view information, pages, and applications available to it from database system 16 over network 14.

Each user system 12 also typically includes one or more user input devices, such as a keyboard, a mouse, a trackball, a touch pad, a touch screen, a pen or stylus, or the like, for interacting with a graphical user interface (GUI) provided by the browser on a display (for example, a monitor screen, liquid crystal display (LCD), light-emitting diode (LED) display, etc.) of user system 12 in conjunction with pages, forms, applications, and other information provided by database system 16 or other systems or servers. For example, the user interface device can be used to access data and applications hosted database system 16, and to perform searches on stored data, or otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with database system 16, that user system can have the capacities allotted to the salesperson. However, while an administrator is using that user system 12 to interact with database system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU), such as a Core® processor commercially available from Intel Corporation or the like. Similarly, database system 16 (and additional instances of an MTS, where more than one is present) and all of its components can be operator-configurable using application(s) including computer code to run using processing device 17, which may be implemented to include a CPU, which may include an Intel Core® processor or the like, or multiple CPUs. Each CPU may have multiple processing cores.

Database system 16 includes non-transitory computer-readable storage media having instructions stored thereon that are executable by or used to program a server or other computing system (or collection of such servers or computing systems) to perform some of the implementation of processes described herein. For example, program code 26 can include instructions for operating and configuring database system 16 to intercommunicate and to process web pages, applications (including visual data cleaning applications), and other data and media content as described herein. In some implementations, program code 26 can be downloadable and stored on a hard disk, but the entire program code, or portions thereof, also can be stored in any other volatile or non-volatile memory medium or device as is well known, such as a read-only memory (ROM) or random-access memory (RAM), or provided on any media capable of storing program code, such as any type of rotating media including floppy disks, optical discs, digital video discs (DVDs), compact discs (CDs), micro-drives, magneto-optical discs, magnetic or optical cards, nanosystems (including molecular memory integrated circuits), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, virtual private network (VPN), local area network (LAN), etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VB Script, and many other programming languages as are well known.

Figure 1B:
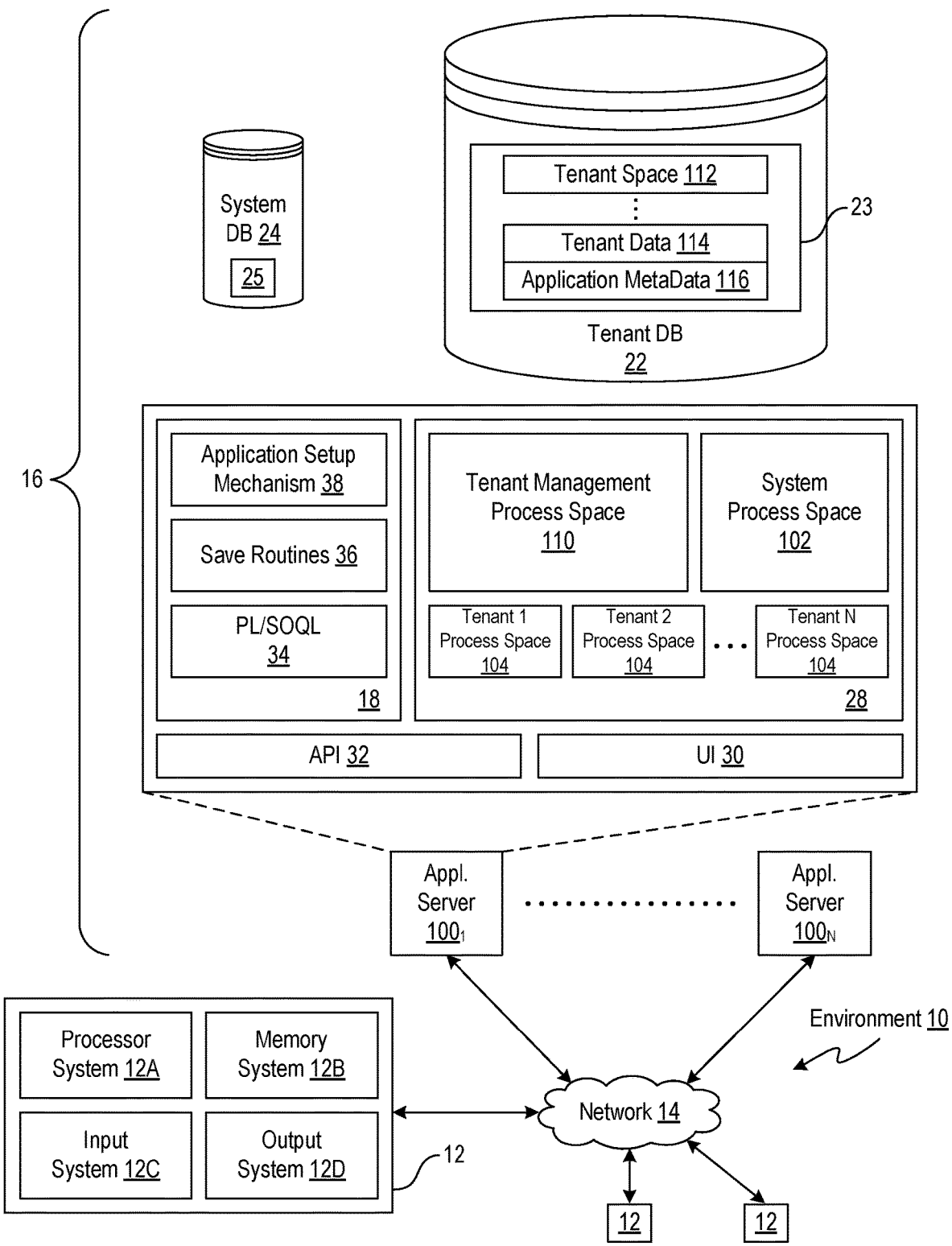
FIG. 1B illustrates example implementations of elements of FIG. 1A and example interconnections between these elements according to some embodiments.

FIG. 1B illustrates a block diagram of example implementations of elements of FIG. 1A and example interconnections between these elements according to some implementations. That is, FIG. 1B also illustrates environment 10, but in FIG. 1B, various elements of database system 16 and various interconnections between such elements are shown with more specificity according to some more specific implementations. In some implementations, database system 16 may not have the same elements as those described herein or may have other elements instead of, or in addition to, those described herein.

In FIG. 1B, user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, network interface 20 is implemented as a set of HTTP application servers $100_1$-$100_N$. Each application server 100, also referred to herein as an "app server," is configured to communicate with tenant database 22 and tenant data 23 stored therein, as well as system database 24 and system data 25 stored therein, to serve requests received from user systems 12. Tenant data 23 can be divided into individual tenant storage spaces 112, which can be physically or logically arranged or divided. Within each tenant storage space 112, tenant data 114 and application metadata 116 can similarly be allocated for each user. For example, a copy of a user's most recently used (MRU) items can be stored in tenant data 114. Similarly, a copy of MRU items for an entire organization that is a tenant can be stored to tenant space 112.

Database system 16 of FIG. 1B also includes a user interface (UI) 30 and an application programming interface (API) 32. Process space 28 includes system process space 102, individual tenant process spaces 104 and a tenant management process space 110. Application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process space 110, for example. Invocations to such applications can be coded using procedural language for structured query language (PL/SQL) 34, which provides a programming language style interface extension to the API 32. A detailed description of some PL/SQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, issued on Jun. 1, 2010, and hereby incorporated by reference herein in its entirety and for all purposes. Invocations to applications can be detected by one or more system processes, which manage retrieving application metadata 116 for the subscriber making the invocation and executing the metadata as an application in a virtual machine.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_2$ can be coupled via a direct network link, and another application server $100_N$ can be coupled by yet a different network connection. Transfer Control Protocol and Internet Protocol (TCP/IP) are examples of typical protocols that can be used for communicating between application servers 100 and database system 16. However, it will be apparent to one skilled in the art that other transport protocols can be used to optimize database system 16 depending on the network interconnections used.

In some implementations, each application server 100 is configured to handle requests for any user associated with any organization that is a tenant of database system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between application servers 100 and user systems 12 to distribute requests to application servers 100. In one implementation, the load balancer uses a least-connections algorithm to route user requests to application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, database system 16 can be a multi-tenant system in which database system 16 handles storage of, and access to, different objects, data, and applications across disparate users and organizations.

In some embodiments, server 100 includes a transpiler, running in system process space 102, for generating output source code (such as JavaScript (JS)) from input source code (such as formula syntax), the output source code to be delivered via an application programming interface (API) to and be evaluated by one or more user systems 12.

In one example storage use case, one tenant can be a company that employs a sales force where each salesperson uses database system 16 to manage aspects of their sales. A user can maintain contact data, leads data, customer followup data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed database system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, database system 16 also can maintain system level data usable by multiple tenants or other data. Such system level data can include industry reports, news, postings, and the like that are sharable among tenants.

In some implementations, user systems 12 (which also can be client systems) communicate with application servers 100 to request and update system-level and tenant-level data from database system 16. Such requests and updates can involve sending one or more queries to tenant database 22 or system database 24. Database system 16 (for example, an application server 100 in database system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, issued on Aug. 17, 2010, and hereby incorporated by reference herein in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
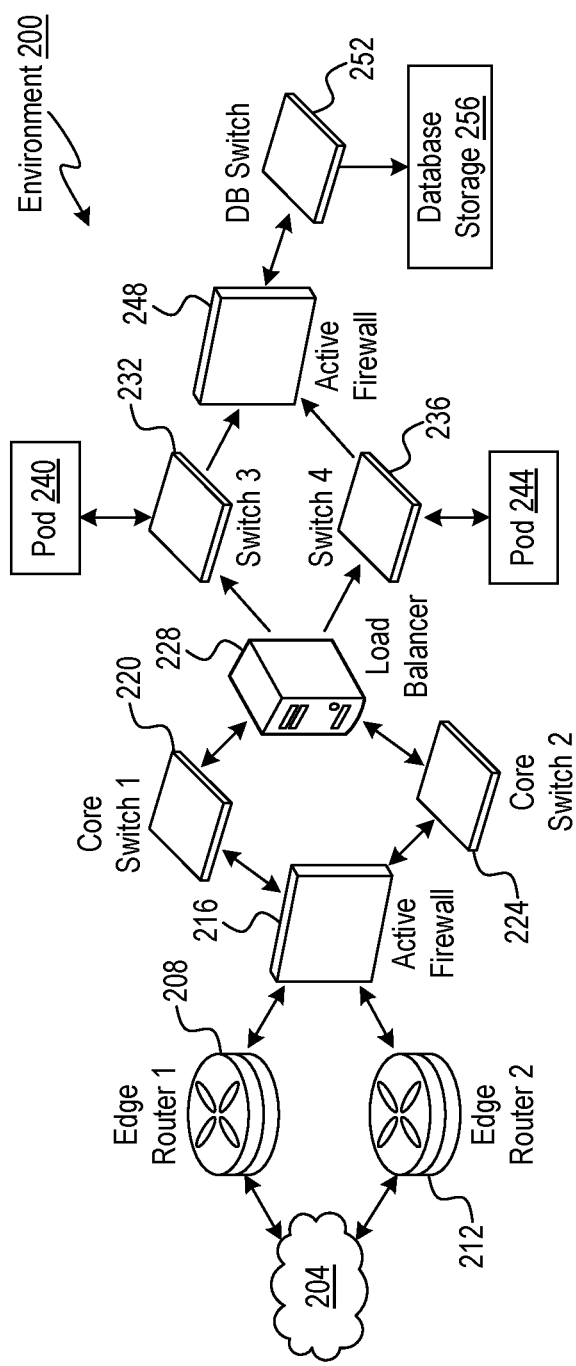
FIG. 2A illustrates example architectural components of an on-demand database service environment according to some embodiments.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. Pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
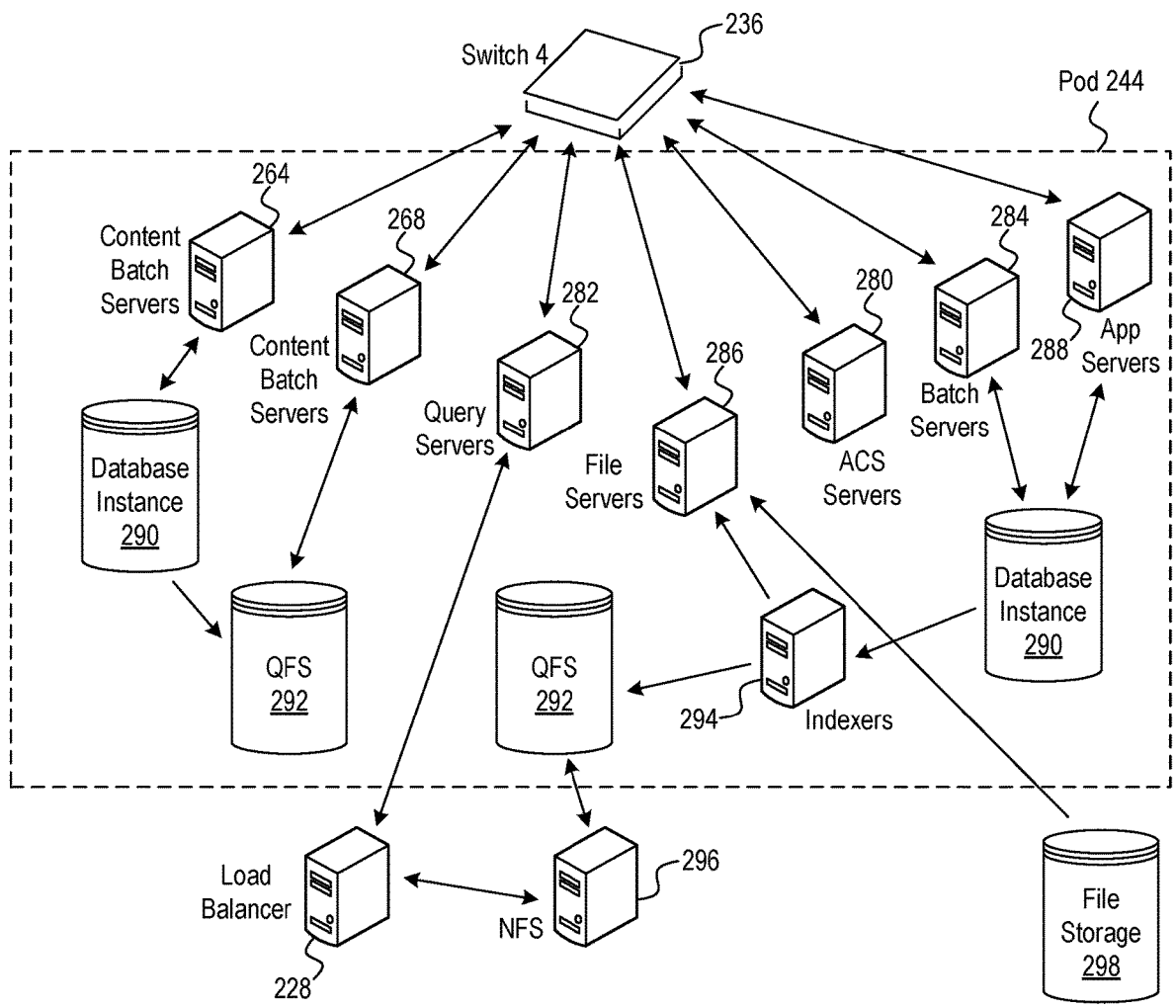
FIG. 2B illustrates example architectural components of an on-demand database service environment according to some embodiments.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to many devices of each type. Also, the on-demand database service environment need not include each device shown in FIGS. 2A and 2B or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server," "device," and "processing device" as used herein are not limited to a single hardware device; rather, references to these terms can include any suitable combination of hardware and software configured to provide the described functionality.

Cloud 204 is intended to refer to a data network or multiple data networks, often including the Internet. Client machines communicably connected with cloud 204 can communicate with other components of the on-demand database service environment 200 to access services provided by the on-demand database service environment. For example, client machines can access the on-demand database service environment to retrieve, store, edit, or process information. In some implementations, edge routers 208 and 212 route packets between cloud 204 and other components of the on-demand database service environment 200. For example, edge routers 208 and 212 can employ the Border Gateway Protocol (BGP). The BGP is the core routing protocol of the Internet. Edge routers 208 and 212 can maintain a table of Internet Protocol (IP) networks or 'prefixes,' which designate network reachability among autonomous systems on the Internet.

In some implementations, firewall 216 can protect the inner components of the on-demand database service environment 200 from Internet traffic. Firewall 216 can block, permit, or deny access to the inner components of on-demand database service environment 200 based upon a set of rules and other criteria. Firewall 216 can act as one or more of a packet filter, an application gateway, a stateful filter, a proxy server, or any other type of firewall.

In some implementations, core switches 220 and 224 are high-capacity switches that transfer packets within the on-demand database service environment 200. Core switches 220 and 224 can be configured as network bridges that quickly route data between different components within the on-demand database service environment. In some implementations, the use of two or more core switches 220 and 224 can provide redundancy or reduced latency.

In some implementations, pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between pods 240 and 244 is conducted via pod switches 232 and 236. Pod switches 232 and 236 can facilitate communication between pods 240 and 244 and client machines communicably connected with cloud 204, for example, via core switches 220 and 224. Also, pod switches 232 and 236 may facilitate communication between pods 240 and 244 and database storage 256. In some implementations, load balancer 228 can distribute workload between pods 240 and 244. Balancing the on-demand service requests between the pods can assist in improving the use of resources, increasing throughput, reducing response times, or reducing overhead. Load balancer 228 may include multilayer switches to analyze and forward traffic.

In some implementations, access to database storage 256 is guarded by a database firewall 248. Database firewall 248 can act as a computer application firewall operating at the database application layer of a protocol stack. Database firewall 248 can protect database storage 256 from application attacks such as SQL injection, database rootkits, and unauthorized information disclosure. In some implementations, database firewall 248 includes a host using one or more forms of reverse proxy services to proxy traffic before passing it to a gateway router. Database firewall 248 can inspect the contents of database traffic and block certain content or database requests. Database firewall 248 can work on the SQL application level atop the TCP/IP stack, managing applications' connection to the database or SQL management interfaces as well as intercepting and enforcing packets traveling to or from a database network or application interface.

In some implementations, communication with database storage 256 is conducted via database switch 252. Multi-tenant database storage 256 can include more than one hardware or software components for handling database queries. Accordingly, database switch 252 can direct database queries transmitted by other components of the on-demand database service environment (for example, pods 240 and 244) to the correct components within database storage 256. In some implementations, database storage 256 is an on-demand database system shared by many different organizations as described above with reference to FIGS. 1A and 1B.

FIG. 2B shows a system diagram further illustrating example architectural components of an on-demand database service environment according to some implementations. Pod 244 can be used to render services to a user of on-demand database service environment 200. In some implementations, each pod includes a variety of servers or other systems. Pod 244 includes one or more content batch servers 264, content search servers 268, query servers 282, file servers 286, access control system (ACS) servers 280, batch servers 284, and app servers 288. Pod 244 also can include database instances 290, quick file systems (QFS) 292, and indexers 294. In some implementations, some or all communication between the servers in pod 244 can be transmitted via pod switch 236.

In some implementations, app servers 288 include a hardware or software framework dedicated to the execution of procedures (for example, programs, routines, scripts) for supporting the construction of applications provided by on-demand database service environment 200 via pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

In an embodiment, one or more transpilers are executed by app servers 288 to transform input source code to output source code.

Content batch servers 264 can handle requests internal to the pod. Some such requests can be long-running or not tied to a particular customer. For example, content batch servers 264 can handle requests related to log mining, cleanup work, and maintenance tasks. Content search servers 268 can provide query and indexer functions. For example, the functions provided by content search servers 268 can allow users to search through content stored in the on-demand database service environment. File servers 286 can manage requests for information stored in file storage 298. File storage 298 can store information such as documents, images, and binary large objects (BLOBs). In some embodiments, file storage 298 is a shared storage. By managing requests for information using file servers 286, the image footprint on the database can be reduced. Query servers 282 can be used to retrieve information from one or more file systems. For example, query servers 282 can receive requests for information from app servers 288 and transmit information queries to network file systems (NFS) 296 located outside the pod.

Pod 244 can share a database instance 290 configured as a multi-tenant environment in which different organizations share access to the same database. Additionally, services rendered by pod 244 may call upon various hardware or software resources. In some implementations, ACS servers 280 control access to data, hardware resources, or software resources. In some implementations, batch servers 284 process batch jobs, which are used to run tasks at specified times. For example, batch servers 284 can transmit instructions to other servers, such as app servers 288, to trigger the batch jobs.

In some implementations, QFS 292 is an open source file system available from Sun Microsystems, Inc. The QFS can serve as a rapid-access file system for storing and accessing information available within the pod 244. QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in NFS 296 or other storage systems.

In some implementations, one or more query servers 282 communicate with the NFS 296 to retrieve or update information stored outside of the pod 244. NFS 296 can allow servers located in pod 244 to access information to access files over a network in a manner similar to how local storage is accessed. In some implementations, queries from query servers 282 are transmitted to NFS 296 via load balancer 228, which can distribute resource requests over various resources available in the on-demand database service environment. NFS 296 also can communicate with QFS 292 to update the information stored on NFS 296 or to provide information to QFS 292 for use by servers located within pod 244.

In some implementations, the pod includes one or more database instances 290. Database instance 290 can transmit information to QFS 292. When information is transmitted to the QFS, it can be available for use by servers within pod 244 without using an additional database call. In some implementations, database information is transmitted to indexer 294. Indexer 294 can provide an index of information available in database instance 290 or QFS 292. The index information can be provided to file servers 286 or QFS 292.

Figure 3:
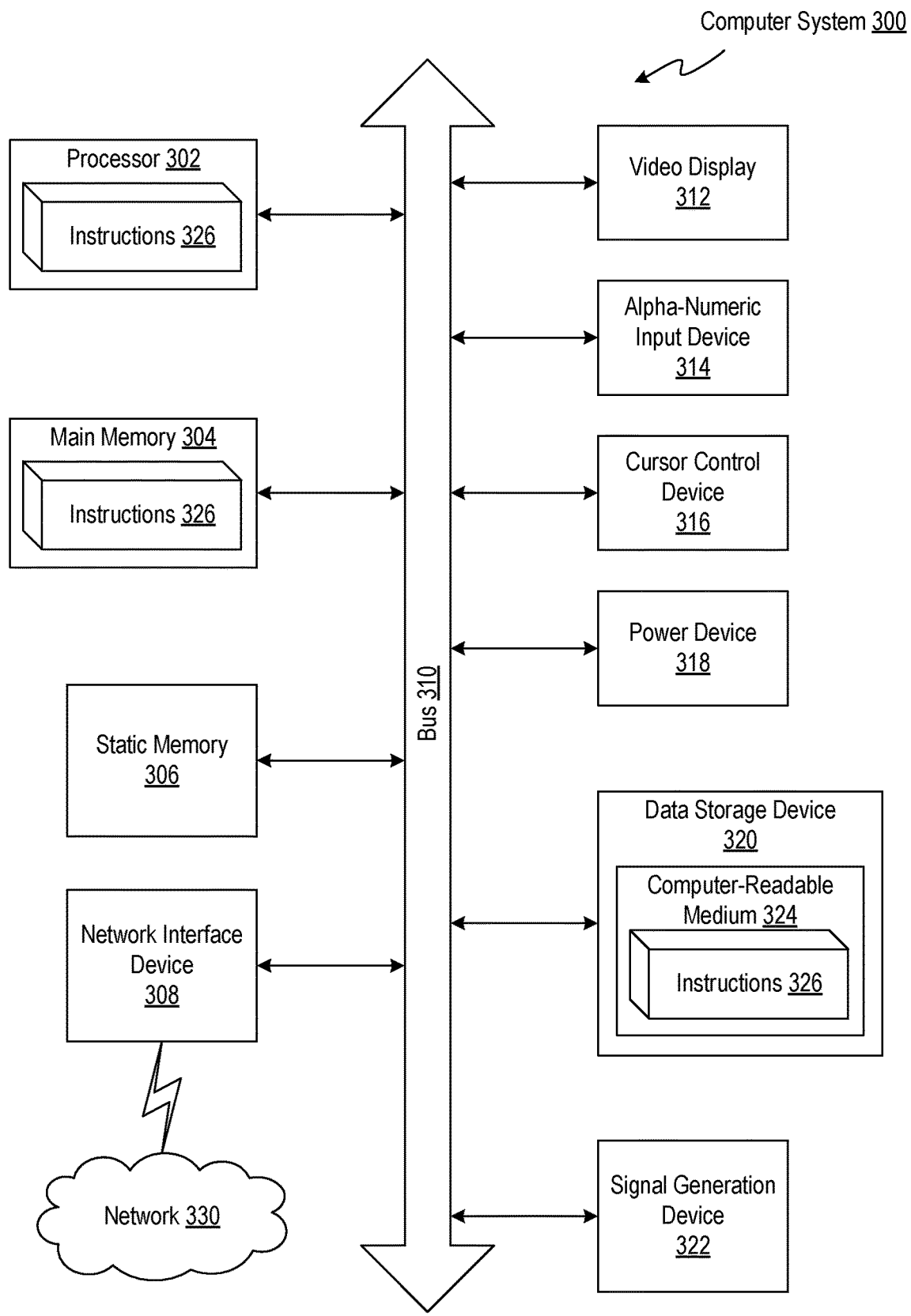
FIG. 3 is a diagrammatic representation of a machine in the exemplary form of a computer system within which one or more embodiments may be carried out.

FIG. 3 illustrates a diagrammatic representation of a machine in the exemplary form of a computer system 300 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 300 may be utilized by or illustrative of any of the electronic components described herein (e.g., any of the components illustrated in or described with respect to FIGS. 1A, 1B, 2A, and 2B).

The exemplary computer system 300 includes a processing device (processor) 302, a main memory 304 (e.g., ROM, flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 320, which communicate with each other via a bus 310.

Processor 302 represents one or more general-purpose processing devices such as a microprocessor, central processing unit, or the like. More particularly, processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 302 may also be one or more special-purpose processing devices such as an application specific integrated circuit (ASIC), a field programmable gate array (FPGA), a digital signal processor (DSP), network processor, or the like. Processor 302 is configured to execute instructions 326 for performing the operations and steps discussed herein. Processor 302 may have one or more processing cores.

Computer system 300 may further include a network interface device 308. Computer system 300 also may include a video display unit 312 (e.g., a liquid crystal display (LCD), a cathode ray tube (CRT), or a touch screen), an alphanumeric input device 314 (e.g., a keyboard), a cursor control device 316 (e.g., a mouse or touch screen), and a signal generation device 322 (e.g., a loud speaker).

Power device 318 may monitor a power level of a battery used to power computer system 300 or one or more of its components. Power device 318 may provide one or more interfaces to provide an indication of a power level, a time window remaining prior to shutdown of computer system 300 or one or more of its components, a power consumption rate, an indicator of whether computer system is utilizing an external power source or battery power, and other power related information. In some implementations, indications related to power device 318 may be accessible remotely (e.g., accessible to a remote back-up management module via a network connection). In some implementations, a battery utilized by power device 318 may be an uninterruptable power supply (UPS) local to or remote from computer system 300. In such implementations, power device 318 may provide information about a power level of the UPS.

Data storage device 320 may include a computer-readable storage medium 324 (e.g., a non-transitory computer-readable storage medium) on which is stored one or more sets of instructions 326 (e.g., software) embodying any one or more of the methodologies or functions described herein. Instructions 326 may also reside, completely or at least partially, within main memory 304 and/or within processor 302 during execution thereof by computer system 300, main memory 304, and processor 302 also constituting computer-readable storage media. Instructions 326 may further be transmitted or received over a network 330 (e.g., network 14) via network interface device 308.

In one implementation, instructions 326 include instructions for performing any of the implementations described herein. While computer-readable storage medium 324 is shown in an exemplary implementation to be a single medium, it is to be understood that computer-readable storage medium 324 may include a single medium or multiple media (e.g., a centralized or distributed database, and/or associated caches and servers) that store the one or more sets of instructions.

Figure 4:
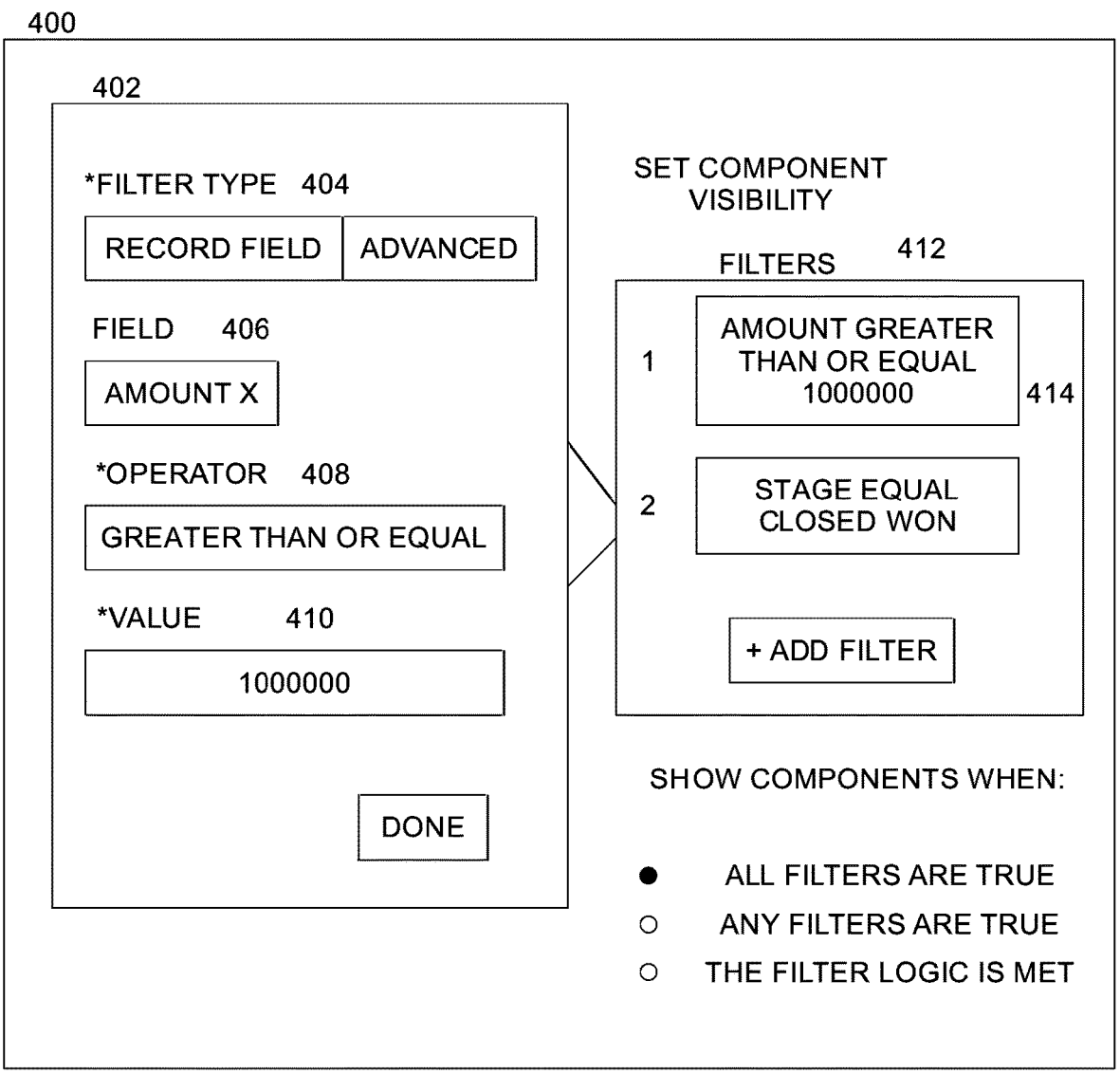
FIG. 4 illustrates an example of a user interface to input data processing commands resulting in a formula in some embodiments.

FIG. 4 illustrates an example of a user interface 400 to input data processing commands resulting in a formula in some embodiments. In one embodiment, user interface 400 is a part of application platform 18 of FIG. 1A. In another embodiment, user interface 400 is a part of user system 12. A user (such as a system administrator, for example), may desire to enter and/or generate an input source code (for example, written in a formula language) to manage processing by database system 16. In one embodiment, the input source code is generated manually by a system administrator or other user by typing in the formula according to the language syntax. In another embodiment, at least a portion of the input source code is automatically produced by selection of predetermined fields in user interface 400 and automatic generation of input source code from those selections. For example, a user may make various selections in user interface window 402 such as filter type 404, field 406, operator 408, and value 410, and filters window 412 such as amount greater than or equal field 414. These fields are only examples and any fields in a UI may be used that result in automatic generation of input source code (e.g., written in a formula language) that conforms to the formula language syntax, grammar and/or rules. Thus, user interface 400 generates input source code representing the selections.

Figure 5:
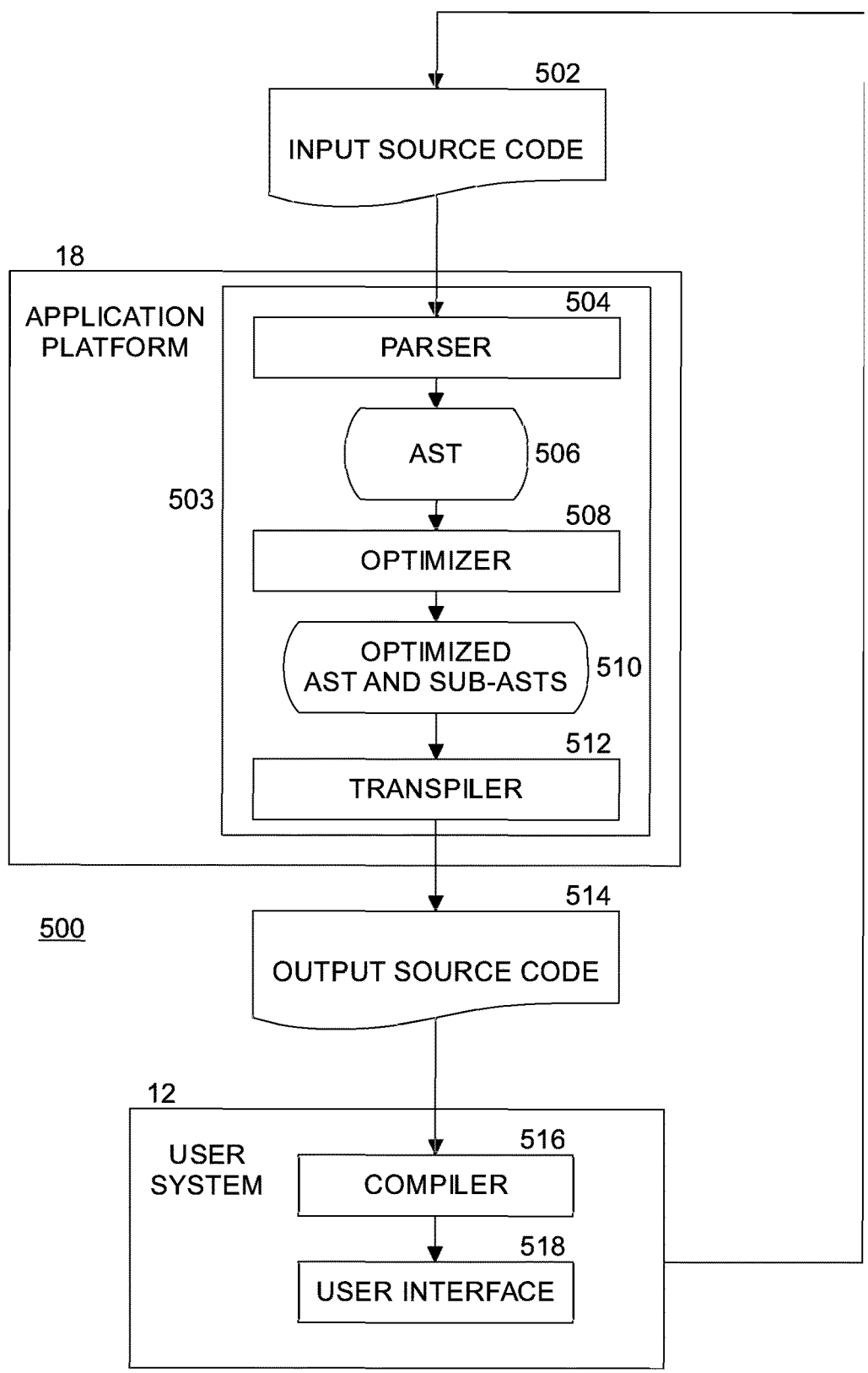
FIG. 5 illustrates an example of an application platform having an optimizing transpiler to transform an input source code into an output source code in some embodiments.

FIG. 5 illustrates an example 500 of an application platform 18 having an optimizing transpiler system 503 to transform input source code 502 into output source code 514 in some embodiments. Input source code 502 (whether manually generated or automatically generated) is input to parser 504 of optimizing transpiler system 503. In one embodiment, input source code 502 is in the syntax of a formula language commercially available from Salesforce. Inc. In other embodiments, other languages may be used for the input source code, such as JavaScript, C++, Coffeescript, Dart, and Hypertext Preprocessor (PHP). Parser 504 analyzes input source code 502 and in at least one embodiment generates an abstract syntax tree (AST) representing the input source code. An AST is a tree representation of the abstract syntactic structure of source code written in a programming language. Each node of the tree denotes a construct occurring in the source code. The syntax is "abstract" in the sense that the AST does not represent every detail appearing in the real syntax, but rather just the structural or content-related details. For instance, grouping parentheses are implicit in the tree structure, so these do not have to be represented as separate nodes. Likewise, a syntactic construct like an if-condition-then expression may be denoted by means of a single node with three branches. In other embodiments, other data structures may be used instead of an AST, including other kinds of trees.

In embodiments of the present invention, AST 506 is input to optimizer 508, which traverses the AST 506, analyzes the structure of the AST, analyzes each node of the AST, and optimizes the AST into an optimized AST and zero or more associated sub-ASTs 510 (e.g., sub-trees). Transpiler 512 transpiles the input source code as represented by the optimized AST and the zero or more associated sub-ASTS 510 to produce output source code 514 written in a selected programming language that is smaller than the output of the transpiler would be without the use of optimizer 508. In one embodiment, output source code 514 is written in JavaScript. In other embodiments, other languages may be used, such as C, C++, and structured query language (SQL). Output source code 514 may then be communicated to user system 12 for evaluation, interpretation, compilation and/or execution by, for example, compiler 518 and/or user interface 518. User system 12 may use additional data to evaluate, interpret, compile and/or execute the output source code.

Figure 6:
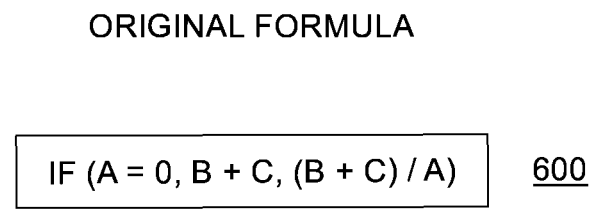

FIG. 6 illustrates an example 600 of a first formula as source input code. In this simple example, the first formula 600 (also called an "original" formula) is written in a first language such as a formula language as shown. In the example, the first formula is the expression "if (a=0, b+c, (b+c)/a)." First formula 600 is parsed by parser 504 to generate an AST.

Figure 7:
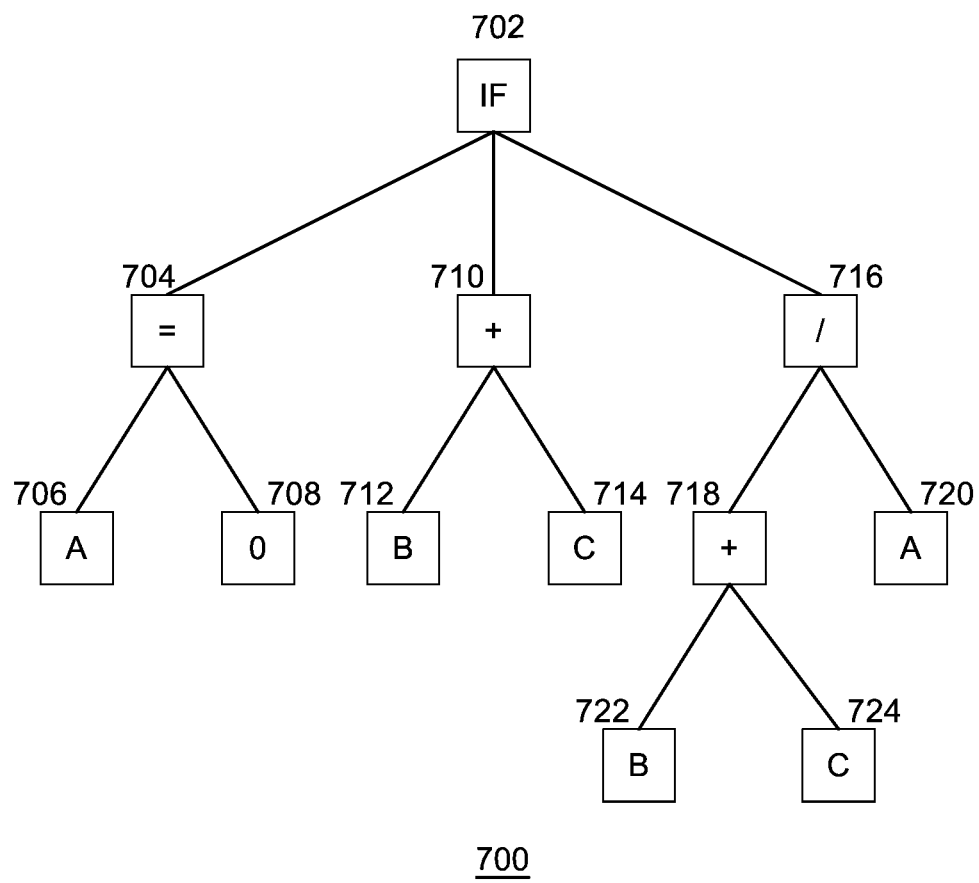
FIG. 7 illustrates an example of an abstract syntax tree (AST) for the first formula.

FIG. 7 illustrates an example of AST 700 generated for the first formula 600 by parser 504. AST 700 includes a root node 702 for the "if" operator. Root node 702 includes three child nodes 704, 710, and 716, each child node being the root node of a sub-tree of AST 700. First child node 704 includes the "=" operator and includes two child nodes of its own, node 706 (including an "a" variable) and node 708 (including a "0" value). Second child node 710 includes the "+" operator and includes two child nodes of its own, node 712 (including a "b" variable) and node 714 (including a "c" variable). Third child node 716 includes the "/" operator and includes two child nodes of its own, node 718 (including the "+" operator) and node 720 (including the "a" variable). Node 718 is also root node of a sub-tree, having two child nodes 722 (including the "b" variable) and 724 (including the "c" variable).

Figure 8:
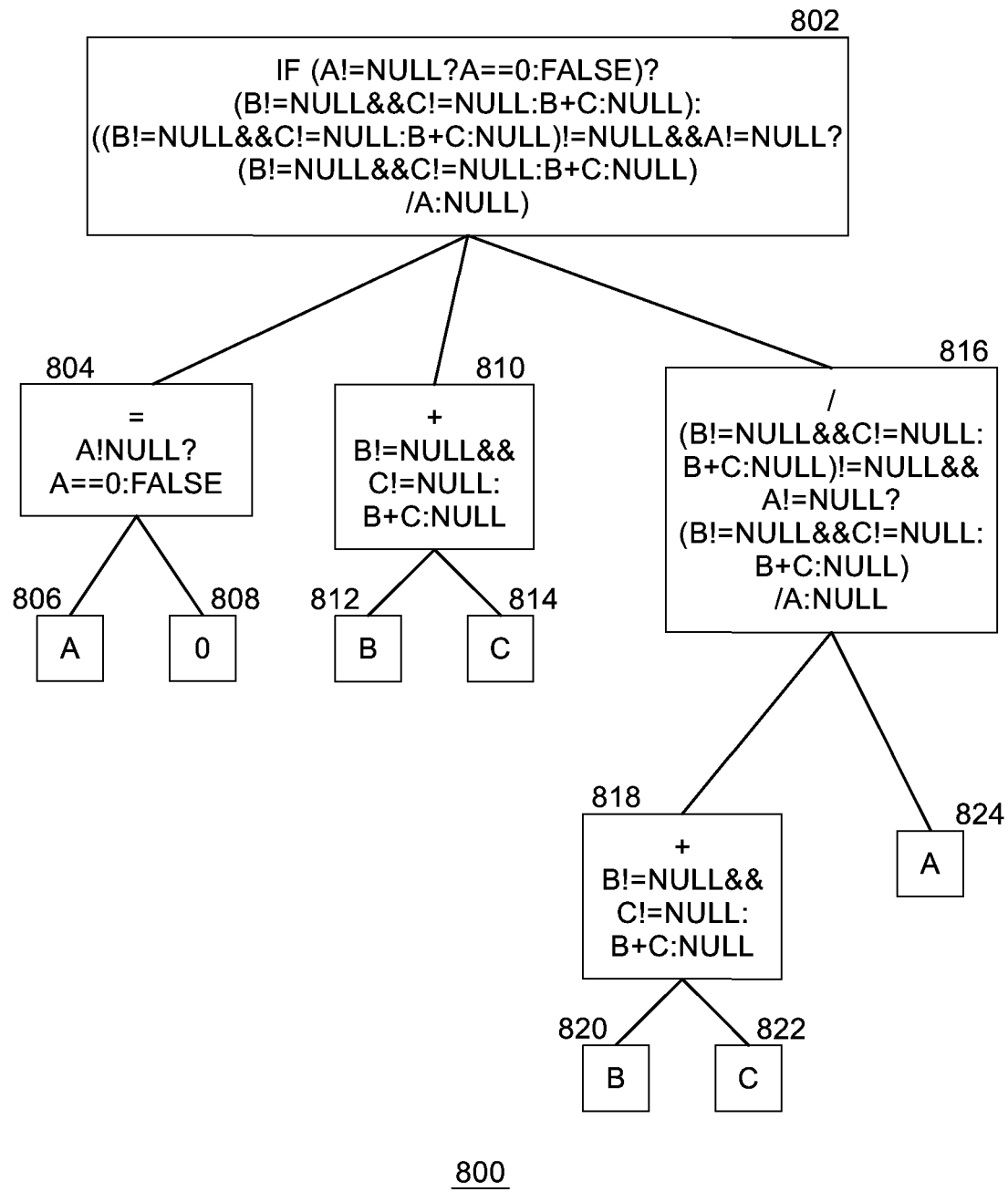
FIG. 8 illustrates an example of the AST for the first formula including generated output source code.

FIG. 8 illustrates an example of an AST 800 for first formula 600 including generated output source code. In this example, transpiler 512 operates on (unoptimized) AST 700 and produces the resulting source output code shown in FIG. 8 as appended (for demonstration purposes) to associated nodes of AST 800. For example, starting with the root node 802 of AST 700, root node 802 includes output source code of "if (a!=null?a==0:false)?(b!=null&&c!=null:b+c:null) ((b!=null&&c!=null:b+c:null)!=null&&a!=null? (b!=null&&c!=null:b+c:null)/a:null)." Node 804 includes output source code of "a!null?a==0:false." Node 806 includes "a." Node 808 includes "0." Node 810 includes "b!=null&&c!=null:b+c:null." Node 812 includes "b." Node 814 includes "c." Node 816 includes "(b!=null&&c!=null: b+c:null)!=null&&a!=null?(b!=null&&c!=null:b+c:null)/a: null." Node 818 includes "b!=null&&c!=null:b+c:null." Node 820 includes "b." Finally, node 822 includes "c."

Thus, the final output source code (unoptimized version) contains 140 characters (e.g., for a JavaScript implementation) "let result=(a!=null?a==0:false)?(b!=null&&c!=null: b+c:null):((b!=null&&c!=null:b+c:null)!=null& &a!=null? (b!=null&&c!null:b+c:null)/a:null)." These 140 characters can be sent to user system 12 for subsequent processing.

In embodiments of the present invention, optimizer 508 analyzes AST 700 to identify and apply optimizations to AST 700 to result in transpiler 512 generating smaller and more efficient output source code based on the optimized AST. For example, optimizer 508, when analyzing AST 700, determines that there is a duplicate sub-tree representing the expression "b+c." This duplicate sub-tree shows up in AST 700 as nodes 710, 712, and 714, and as nodes 718, 722, and 724.

Figure 9:
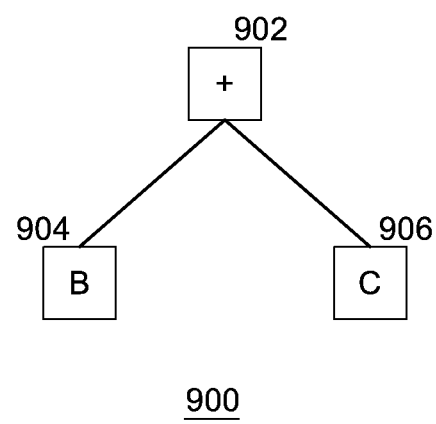
FIG. 9 illustrates an example of a sub-AST according to some embodiments.

FIG. 9 illustrates an example of a sub-AST 900 according to some embodiments. In this example, optimizer 508 defines a new unique variable "x" to represent a sub-tree of AST 700, called a sub-AST herein, having a root node 902 including the "+" operator, and two child nodes, node 904 including the "b" variable and node 906 including the "c" variable. Optimizer 508 logically replaces occurrences of the sub-AST 900 for the expression "b+c" with variable "x" wherever the sub-tree occurs in AST 700, thereby generating an optimized AST.

Figure 10:
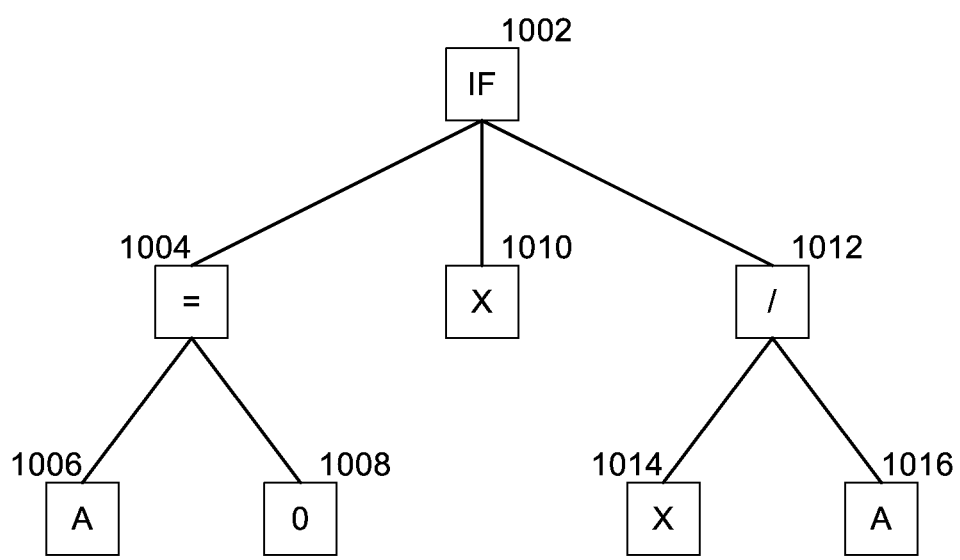
FIG. 10 illustrates an example of an optimized AST for the first formula according to some embodiments.

FIG. 10 illustrates an example of an optimized AST 1000 for first formula 600 according to some embodiments.

Optimized AST 1000 includes root node 1002 including the "if" operator. Root node 1002 has three child nodes 1004, 1010, and 1012. Node 1004 includes the "=" operator and two child nodes, node 1006 (including the "a" variable) and node 1008 (including the "0" value). Node 1010 includes the "x" variable (replacing the expression "b+c" of the original, unoptimized AST with a sub-AST for "x"). Node 1012 includes the "I" operator and two child nodes, node 1014 (including the "x" variable replacing the expression "b+c") and node 1016 (including the "a" variable).

Figure 11:
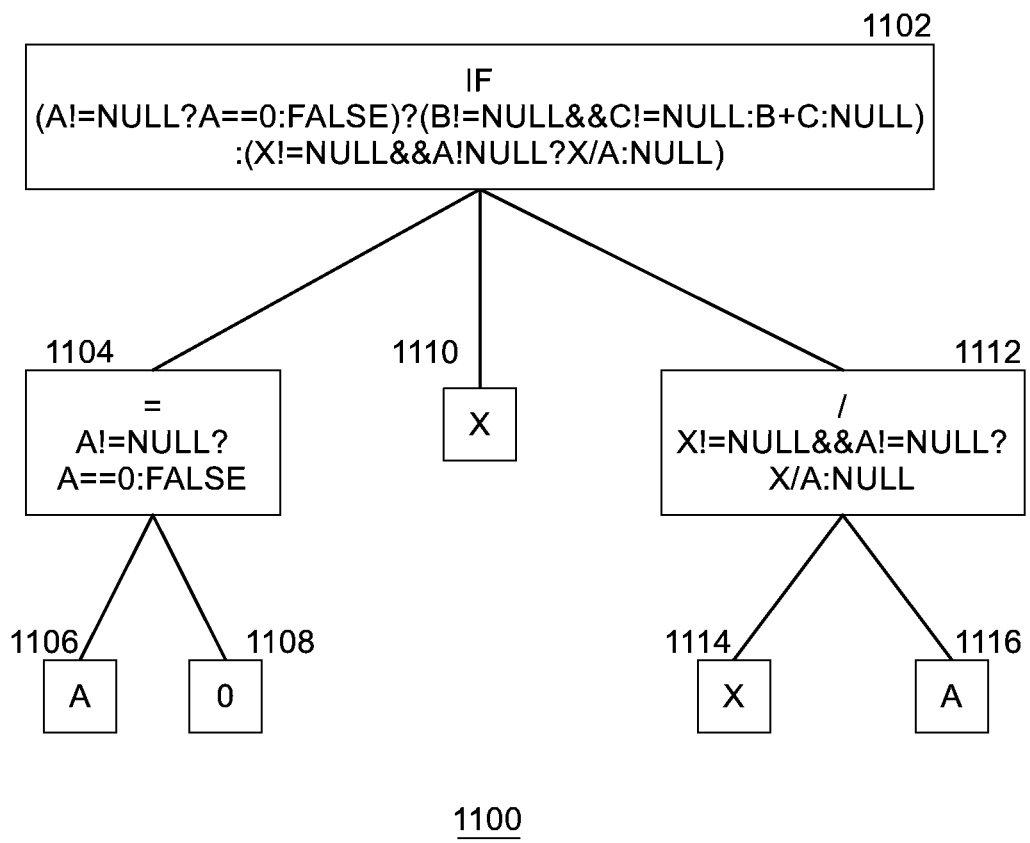
FIG. 11 illustrates an example of an optimized AST for the first formula of including generated output source code according to some embodiments.

FIG. 11 illustrates an example of an optimized AST 1100 for first formula 600 including generated output source code according to some embodiments. In this example, transpiler 512 operates on optimized AST 1000 and produces the resulting source output code shown in FIG. 11 as appended (for demonstration purposes) to associated nodes of AST 1100. For example, root node 1102 includes the "if" operator and "(a!=null?a==0:false)?(x):x!=null&&a!null?x/a:null)." Node 1104 includes the "=" operator and "a!=null?a==0: false." Node 1106 includes the "a" variable. Node 1108 includes the "0" value. Node 1110 includes the "x" variable. Node 1112 includes the "I" operator and "x!=null&&a!=null?x/a:null." Node 1114 includes the "x" variable and node 1116 includes the "a" variable.

Thus, the final output source code (optimized version) contains 121 characters (e.g., for a JavaScript implementation)=

"let x=b!=null&&c!null:b+c:null:"
"let result=(a!=null?a==0:false)?(x): x!=null&&a!=null?x/a:null)."

These 61 characters can be sent to user system 12 for subsequent processing. By using optimizer 508, the resulting output source code has been shrunk by approximately 56%.

FIG. 12 illustrates an example of a second formula 1200 as source input code. In this more complicated example, the second formula 1200 (also called an "original" formula) is written in a first language such as a formula language as shown. Second formula 1200 is parsed by parser 504 to generate an AST.

Figure 13:
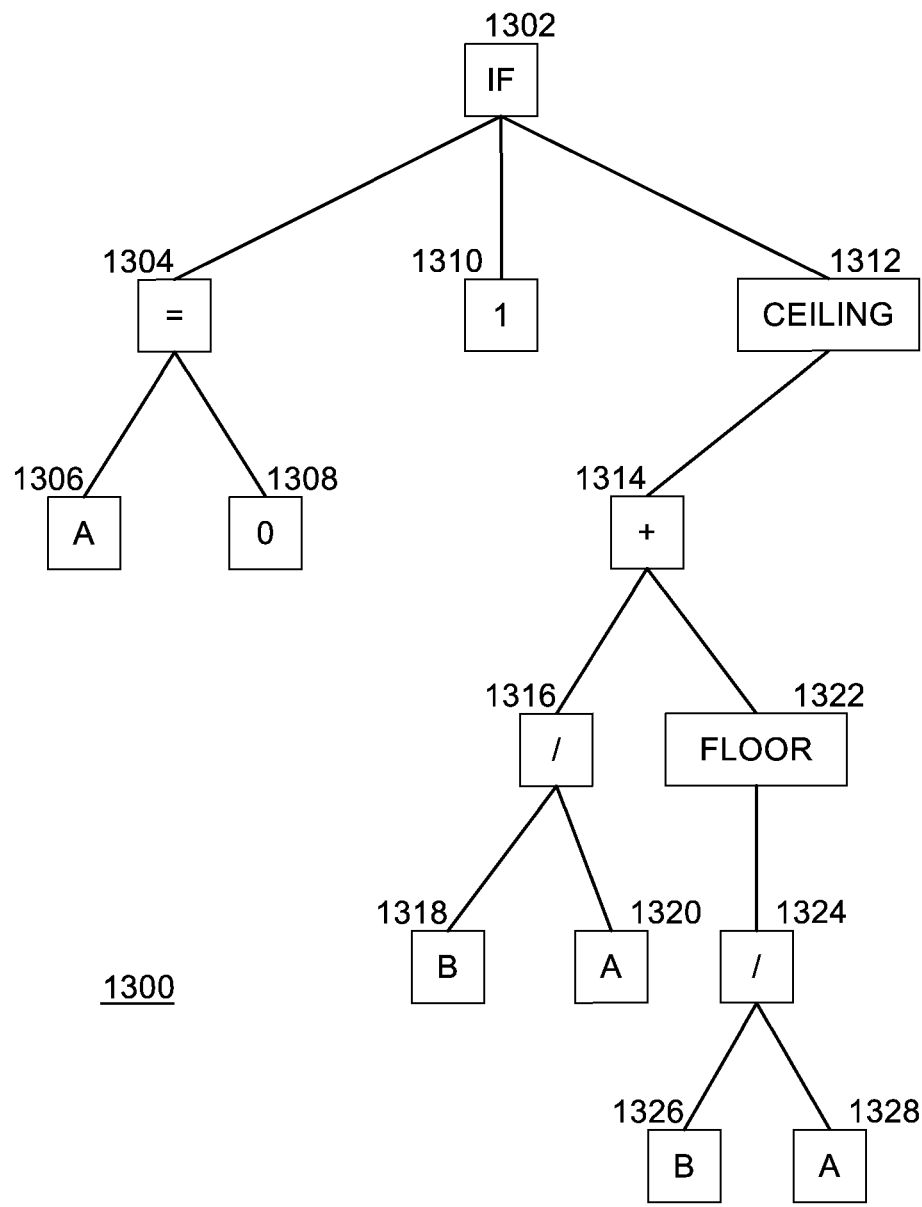
FIG. 13 illustrates an example of an AST for the second formula.

FIG. 13 illustrates an example of an AST 1300 for second formula 1200. AST 1300 is a data structure representation of original formula 1200 generated by parser 504. AST 1300 includes a root node 1302 for the "if" operator. Root node 1302 includes three child nodes 1304, 1310, and 1312. First child node 1304 includes the "=" operator and includes two child nodes of its own, node 1306 (including an "a" variable) and node 1308 (including a "0" value). Second child node 1310 includes the "1" value. Third child node 1312 is root node for a sub-tree for the "ceiling" operator. Node 1312 includes a child node 1314 including the "+" operator. Node 1314 includes two child nodes 1316 and 1322. Node 1316 includes the "I" operator and two child nodes 1318 and 1320. Node 1318 includes the "b" variable. Node 1320 includes the "a" variable. Node 1322 includes the "floor" operator and child node 1324. Node 1324 includes the "I" operator and two child nodes 1326 and 1328. Node 1326 includes the "b" variable and node 1328 includes the "a" variable.

If generated (unoptimized) AST 1300 is submitted to transpiler 512, transpiler will generate 926 characters of resulting output source code as follows:

"Let result=(a!=null?a==0:false)?(1): (((b!=null&&a!=null?b/a:null)!=null&& (((b!=null&&a!=null?b/a:null)>=0?Math.floor ((b!=null&&a!=null?b/a:null)):Math.ceil ((b!=null&&a!=null?b/a:null))))!=null? (b!=null&&a!=null?b/a:null)+(((b!=null&&a!=null?b/a: null))>=0?Math.floor((b!=null&&a!=null?b/a:null)): Math.ceil((b!=null&&a!=null?b/a:null)))):null) >=0?Math.ceil(((b!=null&&a!=null?b/a:null)!=null&& (((b!=null&&a!=null?b/a:null)>=0?Math.floor((b !=null&&a!=null?b/a: null)):Math.ceil((b!=null&& a!=null?b/a:null))))!=null?(b!=null&&a!=null?b/a!=null)+ (((b!=null&&a!=null?b/a!=null))>=0?Math.floor ((b!=null&&a!=null?b/a:null)):Math.ceil ((b!=null&&a!=null?b/a:null))))):null)):Math.floor (((b!=null&&a!=null?b/a:null)!=null &&(((b!=null&&a!=null?b/a:null)>=0?Math.floor((b !=null&&a!=null?b/a:null)):Math.ceil((b !=null&&a!=null?b/a:null))))!=null?(b!=null&&a!=null?b/ a:null)+(((b!=null&&a!=null?b/a:null)>=0?Math.floor ((b!=null &&a!=null?b/a:null)):Math.ceil ((b!=null&&a!=null?b/a:null))))):null)))."

Figure 14:
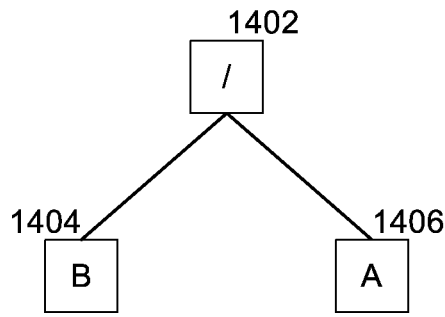
FIG. 14 illustrates examples of sub-ASTs according to some embodiments.
Figure 14:
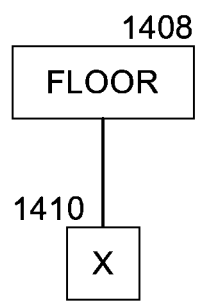
Figure 14:
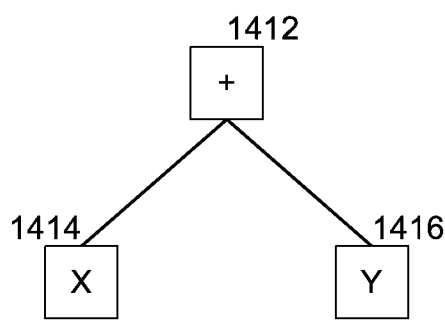

FIG. 14 illustrates examples of sub-ASTs 1400 according to some embodiments. In this example, optimizer 508 defines a new unique variable "x" to represent a sub-AST, having a root node 1402 including the "/" operator, and two child nodes, node 1404 including the "b" variable and node 1406 including the "a" variable. Optimizer 508 logically replaces occurrences of the sub-AST for the expression "b+a" with variable "x" wherever the sub-AST occurs in AST 1300, thereby generating an optimized AST. In this example, optimizer 508 defines a new variable "y" to represent a sub-AST, having a root node 1408 including the "floor" operator and one child node 1410 including the "x" variable. Optimizer 508 logically replaces occurrences of the sub-AST for the expression "floor(x)" with variable "y" wherever the sub-AST occurs in AST 1300. In this example, optimizer 508 defines a new unique variable "z" to represent a sub-AST, having a root node 1412 including the "+" operator, and two child nodes, node 1414 including the "x" variable and node 1416 including the "y" variable. Optimizer 508 logically replaces occurrences of the sub-AST for the expression "x+y" with variable "z" wherever the subtree occurs in AST 1300.

Figure 15:
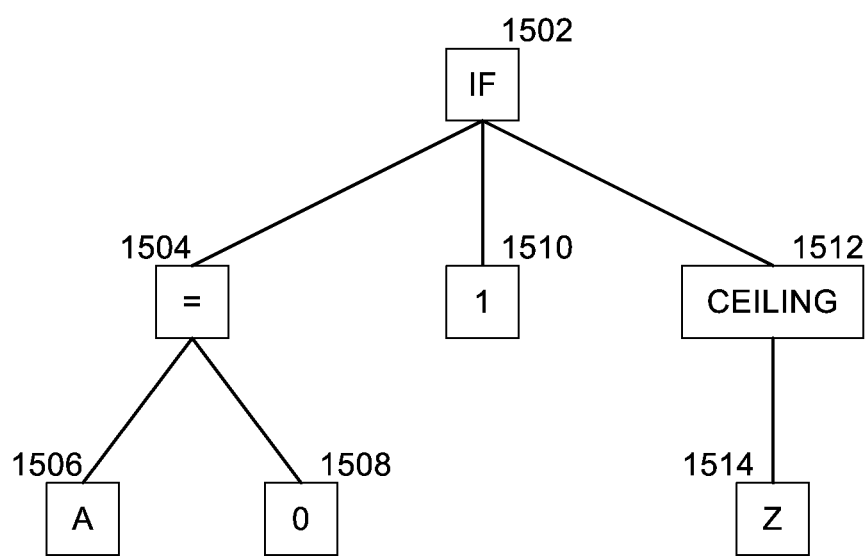
FIG. 15 illustrates an example of an optimized AST for the second formula according to some embodiments.

FIG. 15 illustrates an example of an optimized AST 1500 for second formula 1200 according to some embodiments. Optimized AST 1500 includes root node 1502 including the "if" operator. Root node 1502 has three child nodes 1504, 1510, and 1512. Node 1504 includes the "=" operator and two child nodes, node 1506 (including the "a" variable) and node 1508 (including the "0" value). Node 1510 includes the "1" value. Node 1512 includes the "ceiling" operator and one child node 1514. Child node 1514 includes the "z" variable.

Figure 16:
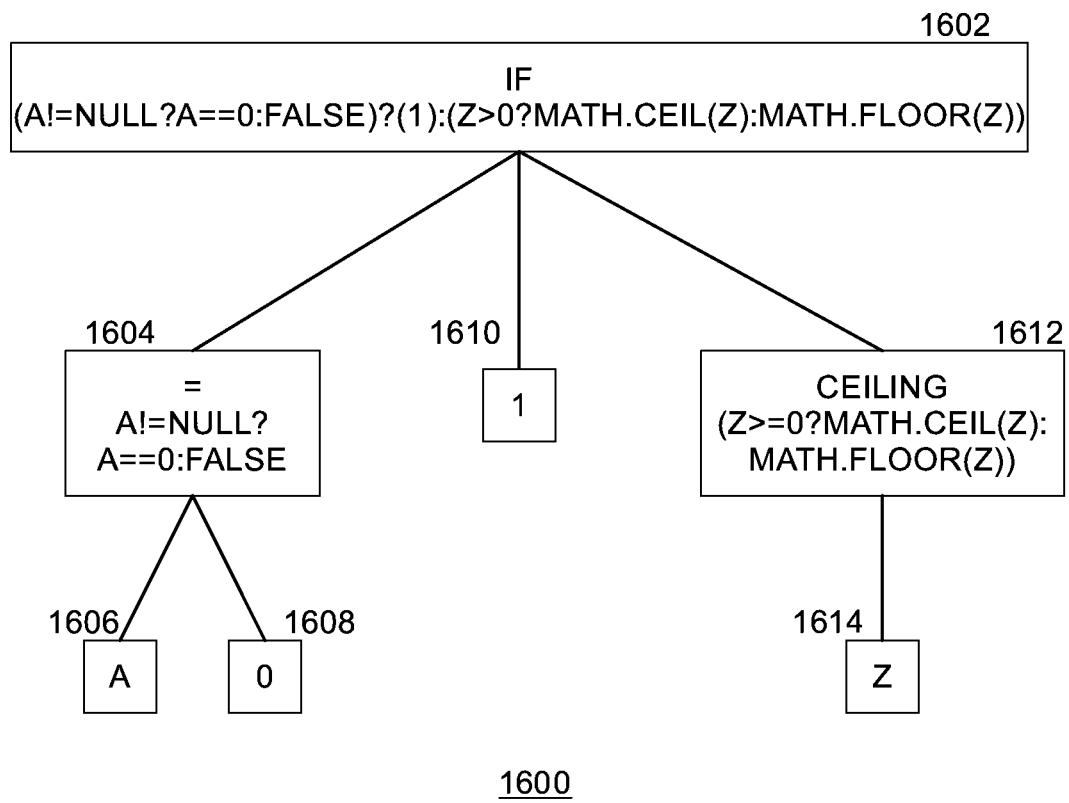
FIG. 16 illustrates an example of an optimized AST for the second formula including generated output source code according to some embodiments.

FIG. 16 illustrates an example of an optimized AST 1600 for second formula 1200 including generated output source code according to some embodiments. In this example, transpiler 512 operates on optimized AST 1500 and produces the resulting source output code shown in FIG. 16 as appended (for demonstration purposes) to associated nodes of AST 1600. For example, root node 1602 includes the "if" operator and "if (a!=null?a==0:false)?(1):(z>0?math.ceil(z): math.floor(z))." Node 1604 includes the "=" operator and "a!=null?a==0:false." Node 1606 includes the "a" variable. Node 1608 includes the "0" value. Node 1610 includes the "1" value. Node 1612 includes the "ceiling" operator and "(z>0?math.ceil(z):math.floor(z))." Node 1614 includes the "z" variable.

Thus, the final output source code (optimized version) contains 180 characters (e.g., for a JavaScript implementation)=

"let x=b!null&&a!null?b/a:null;

```
let y=(x>0?math.floor(x):math.ceil(x));
let z=x!null&&y!null?x+y:null;
let   result=(a!null?a==0:false)?(1):z>=0?math.ceil(z):
math.floor(z)).”
```

These 180 characters can be sent to user system 12 for subsequent processing. By using optimizer 508, the resulting output source code has been shrunk by approximately 81%.

Figure 17:
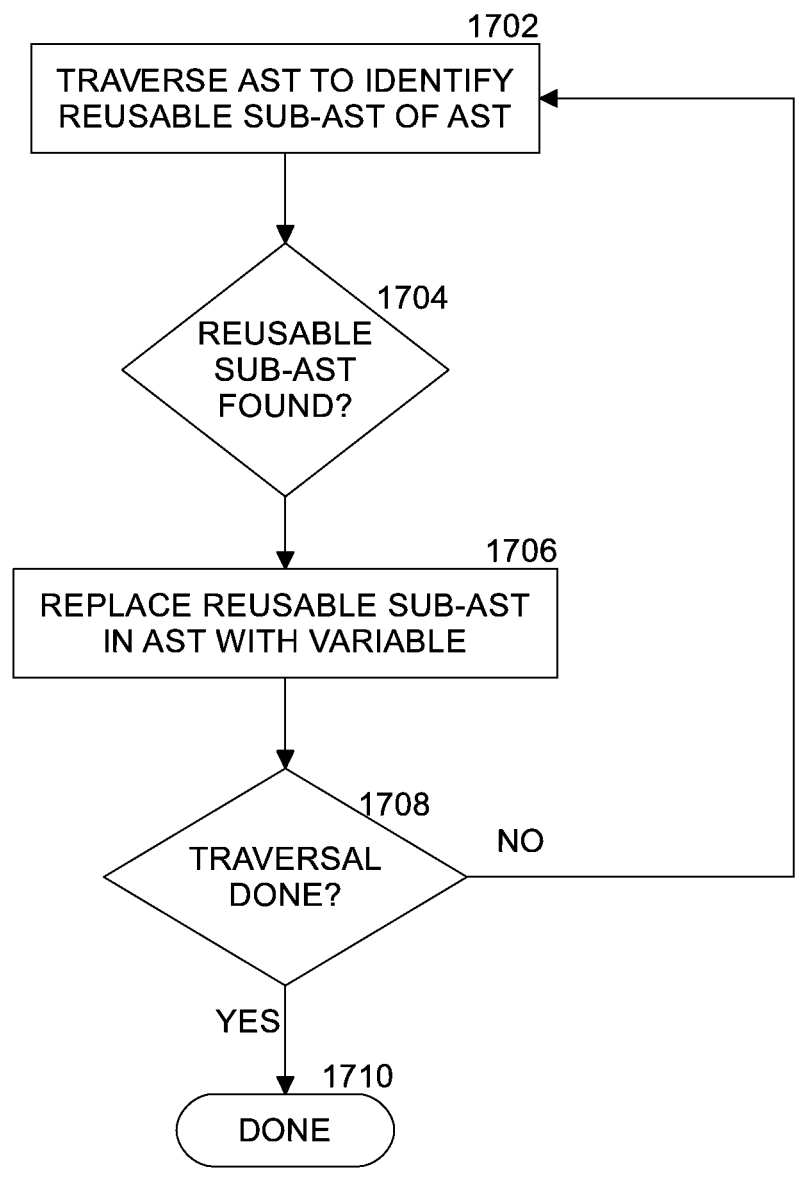
FIG. 17 is a flow diagram of an example process for optimizing an AST according to some embodiments.

FIG. 17 is a flow diagram of an example process 1700 for optimizing an AST according to some embodiments. In an embodiment, this processing is performed by optimizer 508. At block 1702, optimizer traverses the AST 506 representing input source code 502 to identify a reusable sub-AST of AST 506. If a reusable sub-AST is found at block 1704, optimizer 508 replaces the reusable sub-AST in the AST with a variable at block 1706. If a reusable sub-AST is not found at block 1704, processing ends at block 1710. At block 1708, if traversal of the AST is done, then optimization processing is done at block 1710. If traversal of the AST is not done, further traversal continues. In an embodiment, traversal of the AST is performed recursively starting from the root node of the AST.

Figure 18:
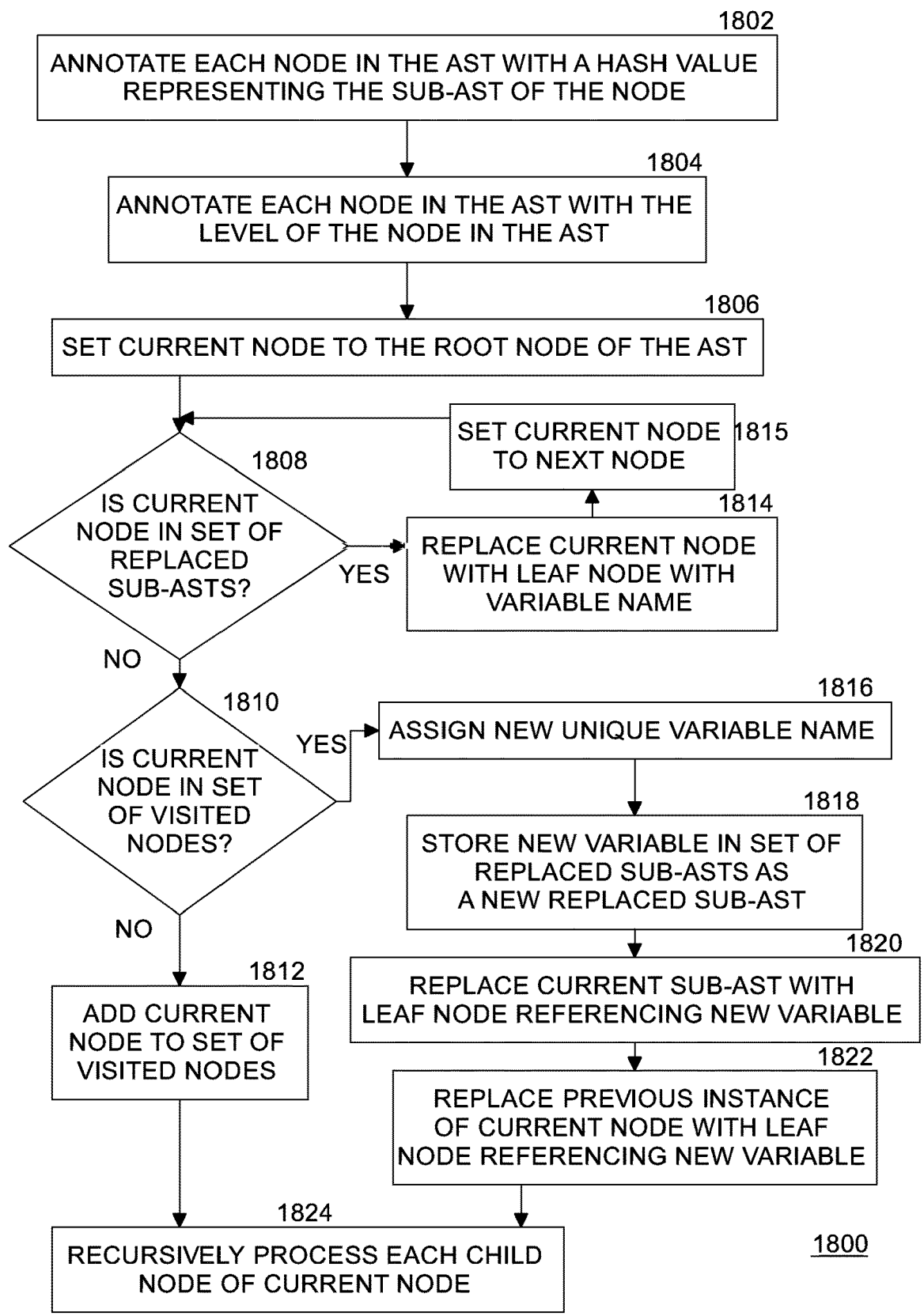
FIG. 18 is a flow diagram of an example process for optimizing an AST according to some embodiments.

FIG. 18 is a flow diagram of an example process 1800 for optimizing an AST according to some embodiments. In an embodiment, this processing is performed by optimizer 508. Process 1800 provides more details than process 1700. At block 1802, optimizer 508 traverses AST 506 and annotates each node in the AST with a hash value representing a sub-AST of the node. The hash value serves as an indicator of the sub-AST. In an embodiment, traversal of the AST is performed recursively. At block 1804, optimizer 508 traverses AST 506 and annotates each node in the AST with the level of the node in the AST. In an embodiment, the level is represented by a natural number (e.g., this signifies the distance down the AST from the root node). Next, optimizer 508 will traverse the AST to identify reusable sub-ASTs. At block 1806, optimizer 508 sets a current node variable to the root node of the AST. The current node variable is used to keep track of where in the AST optimizer processing is currently operating.

In one embodiment, a data structure called a set of visited nodes is used to store information regarding traversal of the AST. Each entry in the set of visited nodes indicates that an identified node has already been visited during traversal of the AST. In one embodiment, a data structure called a set of replaced sub-ASTs is used to store information regarding optimization of the AST. Each entry in the set of replaced sub-ASTs indicates that an identified node (and the node's sub-tree) has been replaced by a variable.

At block 1808, if the current node is equivalent to one of the nodes in the set of replaced sub-ASTs, then the contents of the current node have already been encountered during earlier (e.g., higher) traversal of AST. The earlier encounter resulted in replacing the node with a variable. At block 1814, optimizer 508 replaces the current node in the AST (and the node's sub-tree) with a new leaf node with the variable name of the earlier replaced sub-AST. Optimizer processing continues with further traversal of the AST by setting the current node to the next node in the AST at block 1815. In an embodiment, the next node is the node in the AST to be visited as part of recursive traversal of the AST (e.g., a subsequent node on the same level of the AST as the current node, or the first node of the next level of the AST).

At block 1808, if the current node is not equivalent to any node in the set of replaced sub-ASTs, processing proceeds to block 1810, where optimizer 508 determines if the current node is in the set of visited nodes (e.g., meaning the optimizer has previously processed a node with the same contents earlier in the AST traversal). If the current node does not match or is not equivalent to is any node in the set of visited nodes, this is the first time this node has been encountered during AST traversal. Optimizer 508 then adds the current node to the set of visited nodes at block 1812. Processing continues by recursively processing each child node of the current node. This involves setting the current node to a child node and changing program control back to block 1808 for processing of the child node.

At block 1810, if the current node is in the set of visited nodes, the contents of the current node have already been encountered earlier during the traversal of the AST. In that case, at block 1816 optimizer 508 assigns a new unique variable name to the current node (e.g., a variable name not already stored in the set of replaced sub-ASTs). At block 1818, optimizer 508 stores the new variable name in the set of replaced sub-ASTs as a newly replaced sub-AST. At block 1820, optimizer 508 replaces the current sub-AST (with the current node as its root node) with a leaf node referencing the new variable. At block 1822, optimizer 508 replaces the previous instance of the current node in the AST with a leaf node referencing the new variable. Thus, there have been two replacements—one at the current node and one at the previous node that was passed that is equal to the current node. In one embodiment, optimizer 508 optionally removes the current node from the set of visited nodes to improve the speed at which future nodes may be found. Processing continues by recursively processing each child node of the current node. This involves setting the current node to a child node and changing program control back to block 1808 for processing of the child node. Processing completes when recursive traversal of the AST reaches every node.

Figure 19:
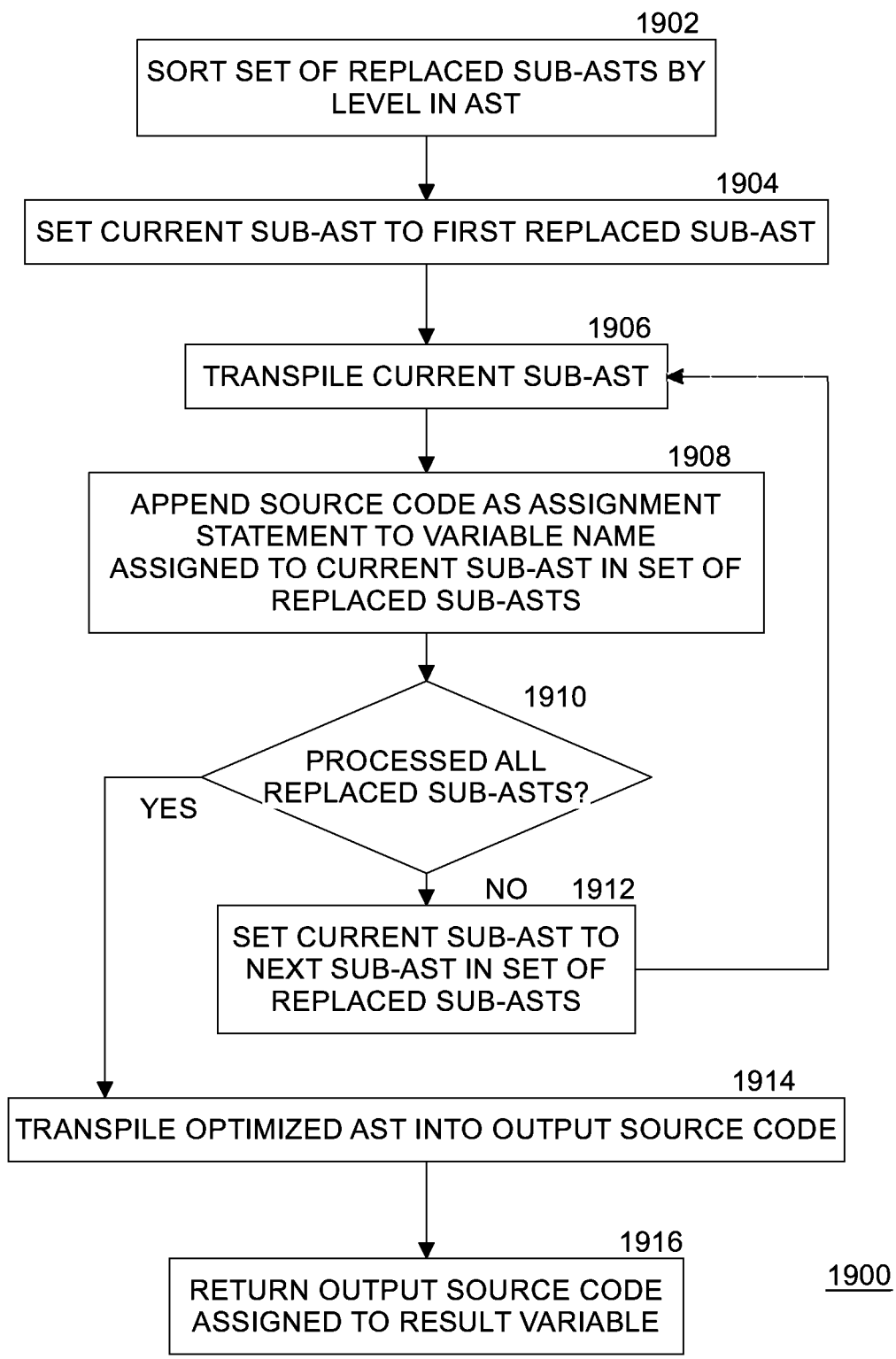
FIG. 19 is a flow diagram of an example process for transpiling input source code represented by an optimized AST and sub-ASTs according to some embodiments.

FIG. 19 is a flow diagram of an example process 900 for transpiling input source code represented by an optimized AST and sub-ASTs 510 according to some embodiments. At block 1902, transpiler 512 sorts the set of replaced sub-ASTs by level in AST 506. In one embodiment, the sorting of the replaced sub-ASTs reorders the replaced sub-ASTs from deepest level of the AST to top-most level of the AST. This ensures that the last/innermost sub-ASTs (e.g., deeper nodes in the AST) are processed first. At block 1904, transpiler 512 sets a current sub-AST to the first replaced sub-AST in the now sorted set of replaced sub-ASTs. At block 1906, transpiler 512 transpiles the current sub-AST. At block 1908, transpiler 512 appends the source code generated for the current sub-AST as an assignment state to the variable name assigned to the current sub-AST in the set of replaced sub-ASTs. At block 1910, transpiler 512 determines if all replaced sub-ASTs have been processed. If not, transpiler 512 sets the current sub-AST to the next sub-AST in the set of replaced sub-ASTs and processing continues with block 1906. If all replaced sub-ASTs have been processed, transpiler 512 transpiles the optimized AST 510 into output source code 514. At block 1916, transpiler 512 returns the output source code 514 as assigned to a result variable.

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an implementation," "one implementation," "some implementations," or "certain implementations" indicates that a particular feature, structure, or characteristic described in connection with the implementation is included in at least one implementation. Thus, the appearances of the phrase "an implementation," "one implementation," "some implementations," or "certain implementations" in various locations throughout this specification are not necessarily all referring to the same implementation.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "generating," "adding," "subtracting," "multiplying," "dividing," "optimizing," "calibrating," "detecting," "performing," "analyzing," "determining," "enabling," "identifying," "modifying," "transforming," "applying," "aggregating," "extracting," "registering," "querying," "populating," "hydrating," "updating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which a computing environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM, and the like without departing from the scope of the implementations claimed. Moreover, the implementations are applicable to other systems and environments including, but not limited to, client-server models, mobile technology and devices, wearable devices, and on-demand services.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™ (a trademark of Sun Microsystems, Inc.), or Perl using, for example, existing or object-oriented techniques. The software code can be stored as non-transitory instructions on any type of tangible computer-readable storage medium (referred to herein as a "non-transitory computer-readable storage medium"). Examples of suitable media include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system and may be among other computer-readable media within a system or network. A computer system, or other computing device, may include a monitor, printer, or other suitable display for providing any of the results mentioned herein to a user.

The disclosure also relates to apparatuses, devices, and system adapted/configured to perform the operations herein. The apparatuses, devices, and systems may be specially constructed for their required purposes, may be selectively activated or reconfigured by a computer program, or some combination thereof.

In the foregoing description, numerous details are set forth. It will be apparent, however, to one of ordinary skill in the art having the benefit of this disclosure, that the present disclosure may be practiced without these specific details. While specific implementations have been described herein, it should be understood that they have been presented by way of example only, and not limitation. The breadth and scope of the present application should not be limited by any of the implementations described herein but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. An apparatus, comprising: a processing device; and a memory device coupled to the processing device, the memory device having instructions stored thereon that, in response to execution by the processing device, cause the processing device to: parse input source code and generate a tree representing the input source code; optimize the tree by recursively traverse the tree starting with a root node of the tree as a current node; if the current node represents a reusable sub-tree already encountered during traversal, replace the current node with a first leaf node assigned to a variable; and if the current node does not represent a reusable sub-tree already encountered during traversal, and the current node has already been encountered during traversal, assign a new variable, replace the current node with a second leaf node referencing the new variable, and replace a previous instance of the current node with a third leaf node referencing the new variable; and transpile the optimized tree to generate output source code.

2. The apparatus of claim 1, wherein the tree is an abstract syntax tree.

3. The apparatus of claim 1, wherein the input source code is in a formula language.

4. The apparatus of claim 1, wherein the output source code in JavaScript.

5. The apparatus of claim 1, wherein instructions to optimize the tree comprise instructions that, in response to execution by the processing device, cause the processing device to: if the current node does not represent a reusable sub-tree already encountered during traversal, and the current node has already been encountered during traversal, store the new variable in a set of replaced sub-trees.

6. The apparatus of claim 1, wherein instructions to optimize the tree comprise instructions that, in response to execution by the processing device, cause the processing device to: if the current node does not represent a reusable sub-tree already encountered during traversal, and the current node has not already been encountered during traversal, add the current node to a set of nodes already encountered during traversal.

7. The apparatus of claim 1, wherein instructions to transpile the optimized tree to generate output source code comprise instructions that, in response to execution by the processing device, cause the processing device to: sort replaced sub-trees by level of the tree; and transpile, in sorted order, each replaced sub-tree, and append generated source code for each replaced sub-tree as an assignment statement to a variable assigned to each replaced sub-tree.

8. The apparatus of claim 7, comprising instructions that, in response to execution by the processing device, cause the processing device to: sort the replaced sub-trees by level of the tree from deepest level of the tree to top-most level of the tree.

9. A computer-implemented method comprising: parsing input source code and generating a tree representing the input source code; optimizing the tree by recursively traversing the tree starting with a root node of the tree as a current node, if the current node represents a reusable sub-tree already encountered during traversal, replacing the current node with a first leaf node assigned to a variable, and if the current node does not represent a reusable sub-tree already encountered during traversal, and the current node has already been encountered during traversal, assigning a new variable, replacing the current node with a second leaf node referencing the new variable, and replacing a previous instance of the current node with a third leaf node referencing the new variable; and transpiling the optimized tree to generate output source code.

10. The computer-implemented method of claim 9, wherein the tree is an abstract syntax tree.

11. The computer-implemented method of claim 9, wherein the input source code is in a formula language.

12. The computer-implemented method of claim 9, wherein the output source code in JavaScript.

13. The computer-implemented method of claim 9, wherein optimizing the tree comprises: if the current node does not represent a reusable sub-tree already encountered during traversal, and the current node has already been encountered during traversal, storing the new variable in a set of replaced sub-trees.

14. The computer-implemented method of claim 9, wherein optimizing the tree comprises: if the current node does not represent a reusable sub-tree already encountered during traversal, and the current node has not already been encountered during traversal, adding the current node to a set of nodes already encountered during traversal.

15. The computer-implemented method of claim 9, wherein transpiling the optimized tree to generate output source code comprises: sorting replaced sub-trees by level of the tree; and transpiling, in sorted order, each replaced sub-tree, and appending generated source code for each replaced sub-tree as an assignment statement to a variable assigned to each replaced sub-tree.

16. The computer-implemented method of claim 15, comprising sorting the replaced sub-trees by level of the tree from deepest level of the tree to top-most level of the tree.

17. A tangible, non-transitory computer-readable storage medium having instructions encoded thereon which, when executed by a processing device, cause the processing device to: parse input source code and generating a tree representing the input source code; optimize the tree by recursively traverse the tree starting with a root node of the tree as a current node; if the current node represents a reusable sub-tree already encountered during traversal, replace the current node with a first leaf node assigned to a variable; and if the current node does not represent a reusable sub-tree already encountered during traversal, and the current node has already been encountered during traversal, assign a new variable, replace the current node with a second leaf node referencing the new variable, and replace a previous instance of the current node with a third leaf node referencing the new variable; and transpile the optimized tree to generate output source code.

18. The tangible, non-transitory computer-readable storage medium of claim 17, wherein instructions stored thereon to optimize the tree comprise instructions that, in response to execution by the processing device, cause the processing device to: if the current node does not represent a reusable sub-tree already encountered during traversal, and the current node has already been encountered during traversal, store the new variable in a set of replaced sub-trees.

19. The tangible, non-transitory computer-readable storage medium of claim 17, wherein instructions stored thereon to optimize the tree comprise instructions that, in response to execution by the processing device, cause the processing device to: if the current node does not represent a reusable sub-tree already encountered during traversal, and the current node has not already been encountered during traversal, add the current node to a set of nodes already encountered during traversal.

20. The tangible, non-transitory computer-readable storage medium of claim 17, wherein instructions stored thereon to transpile the optimized tree to generate output source code comprise instructions that, in response to execution by the processing device, cause the processing device to: sort replaced sub-trees by level of the tree; and transpile, in sorted order, each replaced sub-tree, and append generated source code for each replaced sub-tree as an assignment statement to a variable assigned to each replaced sub-tree.

21. The tangible, non-transitory computer-readable storage medium of claim 20, comprising instructions stored thereon that, in response to execution by the processing device, cause the processing device to: sort the replaced sub-trees by level of the tree from deepest level of the tree to top-most level of the tree.

* * * * *